(12) United States Patent
Smolka et al.

(10) Patent No.: US 6,597,449 B1
(45) Date of Patent: Jul. 22, 2003

(54) REAL TIME PROCESS CONTROL OF OPTICAL COMPONENTS USING LINEARLY SWEPT TUNABLE LASER

(75) Inventors: Gregory L. Smolka, Morgan Hill, CA (US); Mark Wippich, Campbell, CA (US); Carter F. Hand, San Francisco, CA (US); Robert John Shine, Jr., San Jose, CA (US)

(73) Assignee: New Focus, Inc., Santa Clara, CA (US)

(*) Notice: Subject to any disclaimer, the term of this patent is extended or adjusted under 35 U.S.C. 154(b) by 0 days.

(21) Appl. No.: 09/494,614

(22) Filed: Jan. 31, 2000

(51) Int. Cl.[7] ............... G01J 3/00; G01J 3/06; G01B 9/00
(52) U.S. Cl. .............. 356/300; 356/308; 356/309; 356/124; 356/237.1; 356/239.2
(58) Field of Search ............... 356/300, 308, 356/309, 239.2, 124, 237.1; 372/15, 20, 23, 99, 102, 107

(56) References Cited

U.S. PATENT DOCUMENTS

| | | | |
|---|---|---|---|
| 5,179,420 A | 1/1993 | So et al. | 356/73.1 |
| 5,319,668 A | 6/1994 | Luecke | 372/107 |
| 5,379,310 A | 1/1995 | Papen et al. | 372/23 |
| 5,594,744 A | 1/1997 | Lefevre et al. | 372/20 |
| 5,802,085 A | 9/1998 | Lefevre et al. | 372/20 |
| 5,867,512 A | 2/1999 | Sacher | 372/20 |
| 6,359,685 B1 * | 3/2002 | Colbourne et al. | 356/124 |

FOREIGN PATENT DOCUMENTS

| | | | |
|---|---|---|---|
| EP | 0716515 | 6/1966 | H04B/10/08 |
| EP | 0548935 | 6/1992 | G01M/11/00 |
| EP | 0 716 515 A1 * | 6/1996 | H04B/10/08 |
| EP | 0905490 | 3/1999 | G01J/1/00 |
| EP | 0 905 490 A1 * | 3/1999 | G01J/1/00 |
| JP | 05127042 | 5/1993 | G02B/6/28 |

* cited by examiner

*Primary Examiner*—Frank G. Font
*Assistant Examiner*—Roy M. Punnoose
(74) *Attorney, Agent, or Firm*—Alan W. Canoon

(57) ABSTRACT

A system and method for real time process control, using a linearly swept tunable laser, which allows high speed in-situ monitoring and control of wavelength-specific properties of optical components. The invention comprises scanning an optical component with a high speed, high linearity tunable laser, and detecting optical output from the component during the scanning. Preferably, the invention also includes adjusting or controlling the optical properties of the component during scanning, according to detected optical output from the component. The invention is embodied in a process control system comprising a high speed, high linearity, tunable operatively coupled to an optical component which in turn is operatively coupled to an optical detector. A system control processor is operatively coupled to the tunable laser and detector. A processing control unit is associated with the optical component and is operatively coupled to the system control processor. In operation, the optical component is scanned by the tunable laser, and real time process control of one or more wavelength specific properties of the optical component may be carried out according to feedback from the optical detector and process control unit.

20 Claims, 14 Drawing Sheets

REAL TIME PROCESS CONTROL OF OPTICAL COMPONENTS USING LINEARLY SWEPT TUNABLE LASER

BACKGROUND OF THE INVENTION

1. Field of the Invention

The present invention pertains generally to methods and systems for manufacture and characterization of optical components. More specifically, the invention is a method for real time process control, using a linearly swept tunable laser, which allows fast, easy in-situ monitoring and control, as well as post-processing characterization, of wavelength-specific properties of optical components.

2. Description of the Background Art

In telecommunications, specifically with wavelength division multiplexing (WDM), the wavelength characterization of components is critical for proper performance. As more channels are added to WDM systems with narrower channel spacings, the accuracy of wavelength characterization must improve.

The wavelength specific properties of optical components are typically characterized by post-manufacturing testing. One form of such testing involves a step-and-measure approach using tunable lasers. In this technique, a control system sequentially directs a tunable laser to selected wavelengths in discrete steps, with optical characterization carried out at each such step. Even with an effective control system and reliable tunable laser source, each such step generally has a duration on the order of 100 to 500 milliseconds. For a typical optical component which must be wavelength-characterized at sub-nanometer intervals over a range of several nanometers, the testing time required for each individual component thus be several minutes or tens of minutes in duration. For example, where a component is scanned over a hundred nanometer range at ten picometer increments, 10,000 steps are involved and a duration of 5000 seconds, or more than 83 minutes, is required.

Wavelength specific testing of optical components has also been carried out through use of an optical spectrum analyzer (OSA) with an incoherent white light source. The use of an optical spectrum analyzer is very slow, however, and is limited in resolution. Use of optical spectrum analyzer techniques is adequate for filters greater than 0.8 nm (100 GHz) in width, but is not effective for the narrower filter responses necessary for current technologies. The slow characterization time and poor resolution of currently available wavelength characterization techniques greatly increases the time and expense associated with manufacture of wavelength-specific optical components, and have limited optical characterization to post manufacturing quality control environments.

There is accordingly a need for a method for wavelength specific characterization of optical components which is fast, which provides high wavelength resolution, and which can be used in real-time process control during manufacture of optical components. The present invention satisfies these needs, as well as others, and generally overcomes the deficiencies found in the background art.

An object of the invention is to provide a real-time process control system for optical components which allows high speed characterization of wavelength-specific component properties.

Another object of the invention is to provide a real-time process control system for optical components which has high wavelength resolution.

Another object of the invention is to provide a real-time process control system for optical components which allows in situ monitoring and control of wavelength specific component properties during manufacture.

Another object of the invention is to provide a real-time process control system for optical components which utilizes a fast, linear swept tunable laser.

Another object of the invention is to provide a real-time process control system for optical components which delivers high power and an effective dynamic range.

Another object of the invention is to provide a real-time process control system for optical components usable for narrow filter responses.

Further objects and advantages of the invention will be brought out in the following portions of the specification, wherein the detailed description is for the purpose of fully disclosing the preferred embodiment of the invention without placing limitations thereon.

SUMMARY OF THE INVENTION

The present invention is a system and method for real time process control, using a linearly swept tunable laser, which allows high speed in-situ monitoring and control of wavelength- or frequency-specific properties of optical components. In its most general terms, the invention comprises scanning an optical component with a high speed, high linearity tunable laser, and detecting optical output from the component during the scanning. Preferably, the invention also includes adjusting or controlling the optical properties of the component during scanning, according to detected optical output from the component.

By way of example, and not necessarily of limitation, the invention is embodied in a process control system comprising a high speed, high linearity, tunable laser which is operatively coupled to the optical component under characterization. The optical component is operatively coupled to an optical detector. A system control processor is operatively coupled to the tunable laser and detector. Preferably, a manufacturing or processing control unit is associated with the optical component and is operatively coupled to the system control processor.

In operation, the system control processor initiates a fast, linear scan of the optical component by the tunable laser, over a selected wavelength or frequency range and at a selected wavelength tuning rate. During scanning, output from the component is detected by the detector, converted to a digital signal, and provided to the system control processor. Scanning and detection may be carried out via transmission or reflection, according to the particular use of the invention. The system control processor may, responsive to feedback from the detector, direct the manufacturing control unit to physically control a manufacturing operation or operations associated with the optical component, according to the feedback from the detector. The system control processor may additionally, in response to feedback from the detector, adjust the scan speed or range of the tunable laser.

A high scan speed or rate for the tunable laser is important to operation of the invention. Preferably, the laser is tuned at a rate of at least 100 nanometers per second during scanning of the optical component, and may be tuned at a scanning rate within the range of between 5 picometers per second and 40,000 nanometers per second. The linearity and repeatability of laser tuning during scanning is also important. Preferably, tuning linearity is such that a wavelength error of no greater than 0.1 nanometer from best linear fit is provided during scanning, and more preferably of no greater than 0.01 nanometer from best linear fit.

One preferred tunable laser for use with the invention, which provides suitable tuning speed and tuning linearity, is a cam-driven external cavity diode laser (ECDL) apparatus wherein a movable prism is positionally adjusted with respect to a grating according to the action of a cam body on a tuning arm coupled to the prism. The structure and configuration of the cam is controlled to provide high speed, high linearity tuning output from the ECDL apparatus. Various other tunable laser devices may also be used with the invention.

The high tuning speed and high degree of scan linearity as provided by the invention allows high speed real time, in-situ characterization and control of wavelength specific properties of optical components during manufacture of the components. The real time processing control of components during manufacturing according to the invention provides shorter manufacturing times and lower manufacturing costs for optical components than has been achievable heretofore.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Referring more specifically to the drawings, for illustrative purposes the present invention is embodied in the system and method shown generally in FIG. 1 through FIG. 16. It will be appreciated that the system may vary as to configuration and as to details of the parts, and that the method of the invention may vary as to details and the order of the steps, without departing from the basic concepts as disclosed herein.

The invention is a system and method for optical characterization of wavelength specific properties of optical components using a fast, linearly swept tunable laser. The system and method of the invention provide for real time processing of the optical component during optical characterization such that the wavelength specific property can be adjusted or tuned during manufacture of the optical component. The invention is usable with any optical components, passive or active, which have one or more wavelength-specific or wavelength-selective features, properties, dependencies or characteristics. Such optical components may include, for example, optical isolators, circulators, fiber Bragg gratings, multiplexers, demultiplexers, beam splitters and recombiners, interleavers, switches, attenuators, antireflection coatings and other optical coatings, biomedical sensors, and the like. Various other optical components and devices can be used with the invention and will suggest themselves to those skilled in the art upon review of this disclosure, and are considered to be within the scope of this disclosure. Thus, the preferred embodiments and specific examples as disclosed herein are merely exemplary, and should not be considered limiting.

The laser tuning and scanning provided by the invention is primarily disclosed in terms of wavelength ($\lambda$) rather than frequency (v). Wavelength and frequency, as is well known, are related by $c=\lambda v$, where c is equal to the speed of light. It should thus be readily understood that the invention may be used in terms of change in frequency with respect to time as well as change in wavelength with respect to time. (i.e., laser output may be tuned in terms of dv/dt as well as d$\lambda$/dt). Many passive optical components are characterized in terms of frequency rather than wavelength, and it should be understood that the scanning of such components in accordance with the invention may be carried out or characterized in terms of frequency as well as wavelength. Thus, the term "wavelength" as used herein to described the output properties of the tunable lasers used with the invention is meant to include or encompass "frequency" as well.

Figure 1:
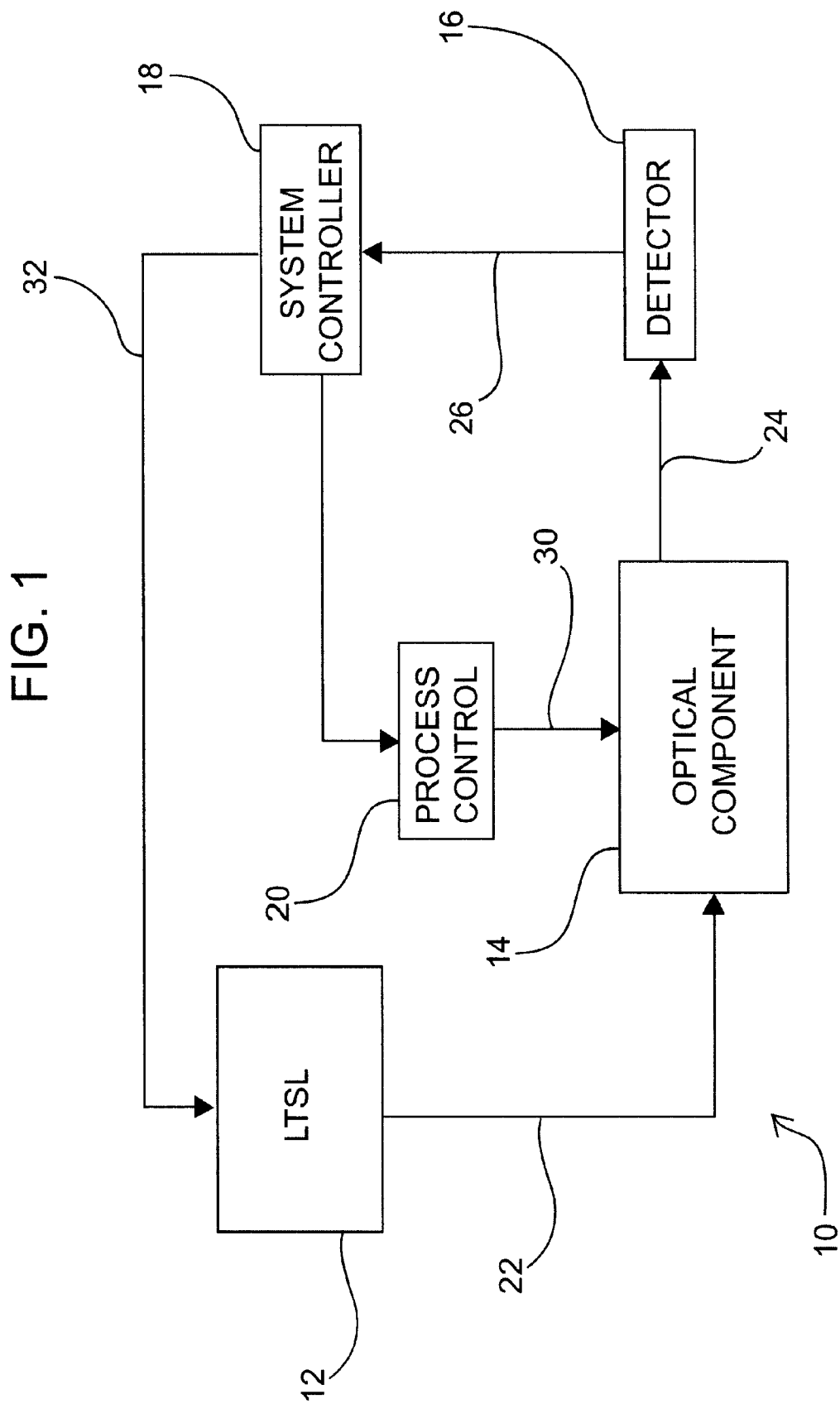
FIG. 1 is a functional block diagram of a preferred embodiment of a real time process control system for optical components in accordance with the present invention.

Referring now to FIG. 1, an optical component characterizing system 10 is shown as a functional block diagram. The system 10 includes generally a tunable laser source 12, an optical component, device or workpiece 14, an optical detector 16, a system controller 18, and a manufacturing process control unit or assembly 20. Tunable laser 12 is optically coupled to optical component 14 via optical interface 22, and optical component is optically coupled to detector 16 via optical interface 24. Detector 16 is operatively coupled to system controller 18 through communication interfaces 26. System controller 18 is operatively coupled to tunable laser 12 through communication interface 28, and is operatively coupled to process control unit 20 through a communication interface 30. Process control unit 20 is operatively coupled to optical component through a process interface 32.

Tunable laser 12 preferably comprises a fast, linearly swept or linearly tunable semiconductor laser (LTSL). The tunable laser 12 preferably has a tunable output which varies linearly, or in a constant, highly predictable manner, with respect to time. Tunable laser 12 also preferably has a fast tuning speed for its output. In the presently preferred embodiments, tunable laser 12 will have a tuning speed of at least one hundred nanometers per second, and will have a tuning linearity such that a wavelength error of no greater than 0.1 nanometer from best linear fit is provided during scanning, and more preferably of no greater than 0.01 nanometer from best linear fit, and even more preferably of no greater than 0.001 nanometer from best linear fit. The exact tuning speed and degree of linearity at which laser 12 is used will necessarily vary as required for the particular optical component and wavelength specific manufacturing or processing of the component as provided by the invention. Thus, the tuning speed for laser 12 may be generally within the range of between about five picoometers per second and about 40,000 thousand nanometers per second. Several external cavity semiconductor laser (ECDL) devices are suitable for use as tunable laser 12 in accordance with the invention and are described in more detail below. As noted above, tunable output may be characterized in terms of change in frequency with respect to time (dv/dt) as well as change in wavelength with respect to time (dλ/dt).

Optical component 14 may comprise any passive or active optical component, device or workpiece having a wavelength-specific or wavelength-selective feature, property, dependency or characteristic, as noted above. Specific examples of selected optical components 14 are discussed further below. Optical interface 22 operatively couples tunable laser 12 to optical component 14, and may comprise any conventional optical interface which can direct the optical output from laser 12 to optical component 14 in a suitable manner. Optical interface 22 may comprise, for example, an optical fiber and/or an optical path defined generally by mirrors, prisms, gratings, lenses, or like elements for defining an optical path. The particular optical interface 22 used with the invention may vary according to the particular optical component 14 and use of the invention.

Detector 16 may comprise any optical detector known in the art, and is preferably operable over a wavelength range which corresponds to the output wavelength range of tunable laser 12. Detector 16 is operatively coupled to optical component 14 via optical interface 24, which may comprise any conventional optical interface which can direct optical output from component to detector 16. Optical interface 24 may comprise a fiberoptic or optical path defined by various reflective and/or transmissive elements, as noted above, with detector 16 being generally structured, configured and positioned to receive optical output from component 14 via optical interface 24.

System controller 18 may comprise, for example, any standard data processing means or computer, including, for example, a minicomputer, a microcomputer, a UNIX® machine, a personal computer (PC) such as INTEL® based processing computer or clone thereof, an APPLE® computer or clone thereof or, a SUN® workstation, or other appropriate computer. System controller 18 generally includes conventional computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. System controller 18 also preferably includes analog-to-digital converter (ADC) capability (not shown), which may be internal or external to system controller 18. System controller 18 may comprise a human operator working with an oscilloscope.

System controller 18 is operatively coupled to detector 16 through communication interface 26, which preferably comprises a conventional interface cable. System controller 18 is configured to load and run software having programming operations associated with digitizing output from detector 16, monitoring digitized output from detector 16, monitoring output from process control 20, directing operation of process control 20 according to or responsive to feedback or output from detector 16, and controlling the scanning of component 14 by tunable laser 12 according to or responsive to feedback or output from process control 20. The operations of system controller 18 are discussed further below.

Process control unit 20 comprises generally a device, assembly, subassembly or system which is structured and configured to carry out one or more manufacturing, processing, testing, or other operations associated with a wavelength specific property or properties of optical component 14. Operations carried out by process control 20 may be optical, electrical, magnetic, mechanical, or of other nature, and the particular nature and details of process control unit 20 will generally vary according to the particular optical component. Specific examples of process control unit 20 are discussed further below. One or more sensors (not shown) may be associated with process control 20 to monitor various aspects of the aforementioned operations carried out by process control unit 20. Process control unit 20 is operatively coupled to system controller 18 via one or more communication interfaces 28. The number and nature of communication interfaces 30 again will vary according to the particular operations carried out by process control 20 and the nature of optical component 14.

Process control unit 20 is operatively coupled optical component 14 via one or more process control interfaces 30. Process control interfaces 30 may be of optical, electrical, magnetic, mechanical, or of other nature, depending upon the manufacturing, processing, testing, or other operations which are carried out on optical component in association with a wavelength specific property or properties, as noted above.

System controller 18 preferably is also operatively coupled to linearly swept semiconductor laser 12 via communication interface 32. Communication interface 32 may comprise a conventional interface cable or like communication interface well known in the art which allows control signals to be sent to tunable laser 12.

In the operation of system 10, the optical component 14 is optically coupled to tunable laser 12 via optical interface 22 such that a wavelength specific aspect of component 14 will receive or be exposed to the output of tunable laser 12 as tunable laser 12 scans component 14. A wavelength range is selected or chosen for the wavelength specific aspect of component 14. The optical component 14 is then scanned by tunable laser 12 over the selected wavelength range, and detector 16 receives or detects output from component 14 during scanning. The term "scanning" as used with herein means generally the directing of optical output from tunable laser 12 to optical component 14 so that the optical output of laser 12 interacts with component 14 via transmission, reflection or otherwise, and such that reflected or transmitted output from component can be directed to detector 16. The output from detector 16 is digitized and monitored by system controller 1 during scanning.

During scanning, system controller 18 may direct process control unit 20 to carry out one or more operations on optical component 14 which are associated with one or more wavelength specific property of component 14. In this manner, the wavelength specific property of component 14 may be adjusted or "tuned" during scanning. The system controller 18 may additionally control scanning by tunable laser 12 according to feedback from detector 16 or process control unit 20 such that the scanning of component 14 by tunable laser 12 is interrupted or altered as necessary. In this manner, real time processing control associated with the manufacture or preparation of component 14 as one or more wavelength specific aspects of component 14 are evaluated and adjusted during processing.

In an alternative embodiment of the system 10, multiple wavelength-specific aspects of component 14 may be simultaneously evaluated and adjusted during processing of component 14. In this regard, multiple tunable laser sources 12, multiple detectors 16, and multiple process control units 20 may be used in connection with optical component 14 and system controller 18. Additional presently preferred embodiments of the invention are discussed further below.

Figure 2:
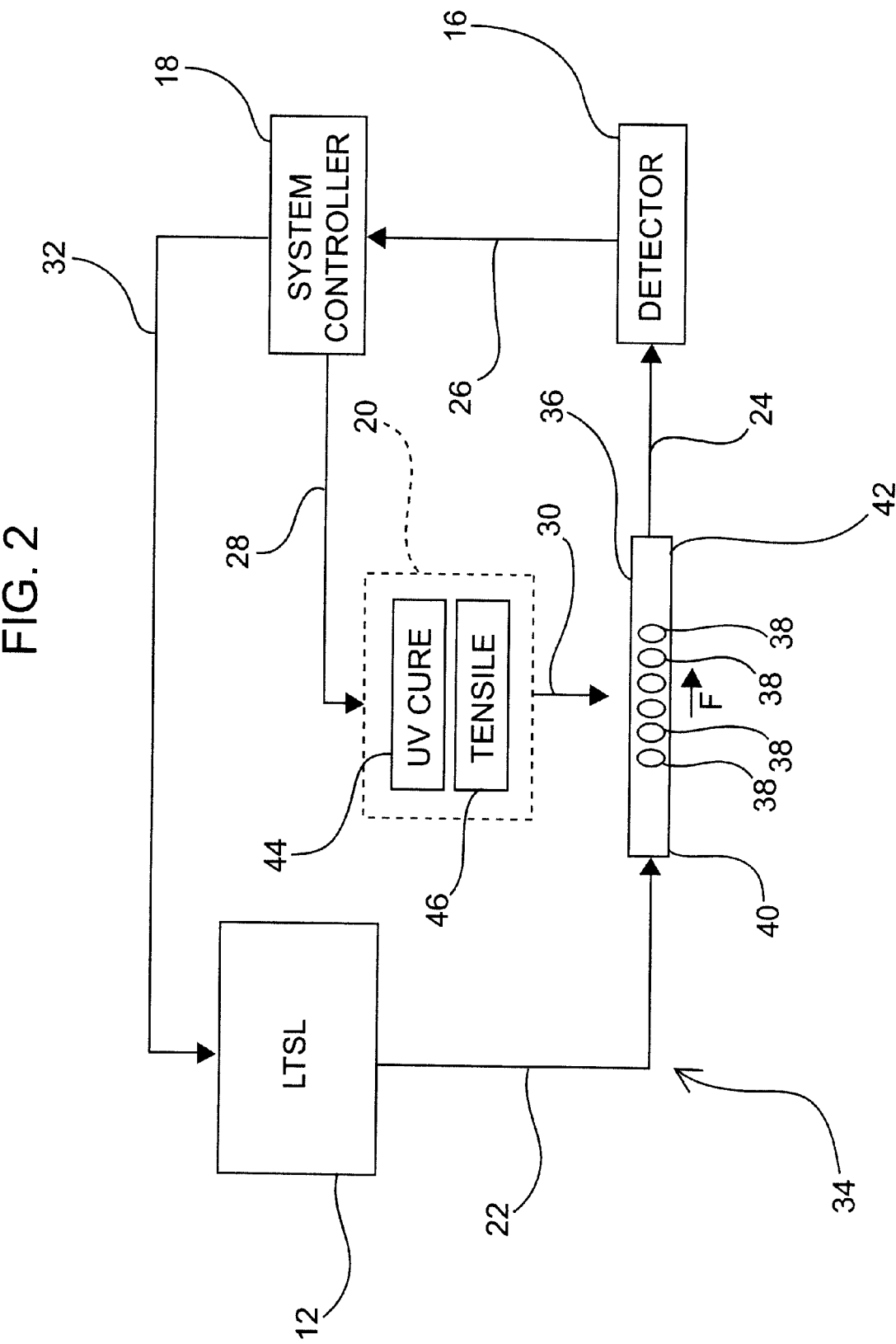
FIG. 2 is a functional block diagram of an alternative embodiment real time process control system in accordance with the invention for use in manufacture of fiber Bragg gratings.

Reference is now made to FIG. 2, wherein an alternative preferred embodiment optical component characterization system 34, wherein like reference numbers are used to denote like parts. System 34 includes a linearly tunable semiconductor laser (LTSL) 12, an optical detector 16, and system controller 18 which are as described above.

The system 34 is shown as structured and configured for use with a fiber Bragg grating (FBG) 36 as an optical component. Fiber Bragg grating 36 is an elongated optical fiber including a plurality of spaced apart domains or regions 38 which have a different refractive index than the remaining portion of fiber Bragg grating 36. Fiber Bragg grating 36 includes a first end 40, and a second end 42. The relative sizes and distances associated with fiber Bragg grating 36 are exaggerated for reasons of clarity and are not necessarily shown to their actual scale.

The domains 38 of different refractive index are created by irradiation using well known techniques. As is well known, the size and spacing of domains 38 effect the optical properties of fiber Bragg grating 36, including, inter-alia, the wavelength specific transmittance of light through (along the longitudinal axis) of fiber Bragg grating 36. The regions of different refractive index 38 in fiber Bragg grating 36 thus can act as a wavelength-specific filter for light travelling through fiber Bragg grating 36. The particular wavelength or wavelength range which is filtered by fiber Bragg grating 36 can be adjusted or "tuned" by increasing or decreasing the spacing between regions 38. One way to adjust the spacing of regions 38 is to immobilize one end of fiber Bragg grating 36 in a housing or casing (not shown), and apply a tensile force to fiber Bragg grating 36 such that regions 38 are stretched apart to increase the spacing between regions. Once a desired spacing arrangement for domains 38 is achieved, the other end is immobilized in the housing to preserve the desired spacing arrangement.

With the above in mind, process control unit 20 in system 34 is structured and configured to allow control of the spacing of regions 38, and thus control the wavelength specific transmission characteristics of fiber Bragg grating 36. To this effect, process control unit 20 preferably includes a UV adhesive/UV cure assembly 44, and a tensile force application assembly 46. UV cure assembly 44 will comprise generally an adhesive dispenser, such as an adhesive "gun" which can selectively apply a desired quantity of a UV curable adhesive, and a UV source such as a UV light "gun" for curing the adhesive. The use of UV cured adhesives for optical components is well known in the art.

UV cure assembly 44 is operatively coupled to system controller 18 via communication interface 28 and operates according to instruction from system controller 18. UV cure assembly 44 preferably includes one or more internal processors (not shown) which allow adhesive application and adhesive curing operations to be carried out according to input from system controller 18. In this regard, UV cure assembly 44 may be considered as robotic or automatically operated via system controller 18 according to feedback from detector 16 and according to programming, associated with system controller 18, for carrying out the basic mechanical operations involved in applying and curing adhesive. Processing interface 30 includes generally the mechanical and optical elements or means required to interface UV cure assembly 44 with fiber Bragg grating 36 such that adhesive application and curing operations may be carried out. The mechanical considerations associated with selectively applying and UV curing adhesive are well known in the art and need not be disclosed herein.

Tensile force application assembly 46 preferably comprises an "Instron" or like device or assembly capable of applying a tensile force to fiber Bragg grating 36. Tensile force application assembly 46 also preferably comprises a processor or processors (not shown) which allow tensile force application operations to be carried out according to input from system controller 18. System controller 18 preferably includes programming or software which can direct operations by assembly 46 in applying a desired tensile force to fiber Bragg grating 36. The mechanical considerations associated with applying a tensile force to a fiber Bragg grating are well known in the art and need not be disclosed here.

In the operation of system 34, first end 40 of fiber Bragg grating 36 is affixed into a housing or packaging (not shown), preferably by means of a UV curable adhesive which is selectively applied to first end 40 and then cured via UV exposure. The affixing of first end 40 of fiber Bragg grating 36 in this manner may be carried out by UV application and cure assembly 44 in process control 20 according to programmed instructions from system controller 18, or may be carried out externally from system 34 by a human operator or by other means.

The fiber Bragg grating 36, with end 40 affixed to its packaging as described above, is optically coupled with linearly tunable semiconductor laser 12 via interface 22, and is optically coupled with detector 16 via interface 24. In this embodiment, interfaces 22, 24 preferably comprise fiberoptics with suitable coupling assemblies such that optical output from tunable laser 12 is directed through fiber Bragg, grating 36, and such that optical output from fiber Bragg grating 36 is directed to detector 16.

A wavelength range is selected over which fiber Bragg grating 36 will be characterized. Scanning is then initiated by tunable laser 12, and fiber Bragg grating 36 is scanned by output from tunable laser 12. The terms "scan" and "scanning" as used with system 34 means generally the directing of optical output from tunable laser 12 into and through fiber Bragg grating 36, such that output from fiber Bragg grating 36 can be directed to detector 16. Preferably the scanning is carried out over the selected wavelength range at a tuning rate which is greater than or equal to one hundred nanometers per second. Preferably, the scanning is also carried out with a tuning linearity such that a wavelength error of no greater than 0.1 nanometer from best linear fit is provided during scanning, and more preferably of no greater than 0.01 nanometer from best linear fit. Once again, the particular tuning speed and tuning linearity required for different uses of the invention will vary according to the different types of optical components and operations carried out by the invention.

During scanning, output from fiber Bragg grating 36 is directed to detector 16 via interface 24. The output from fiber Bragg grating 36 is detected, and corresponding output or feedback from detector 16 is communicated to system controller 18 via interface 26. System controller 18 monitors the output of detector 16, and may direct operations by process control unit 20, or control scanning by tunable laser 12, according to the output of detector 16.

Figure 3:
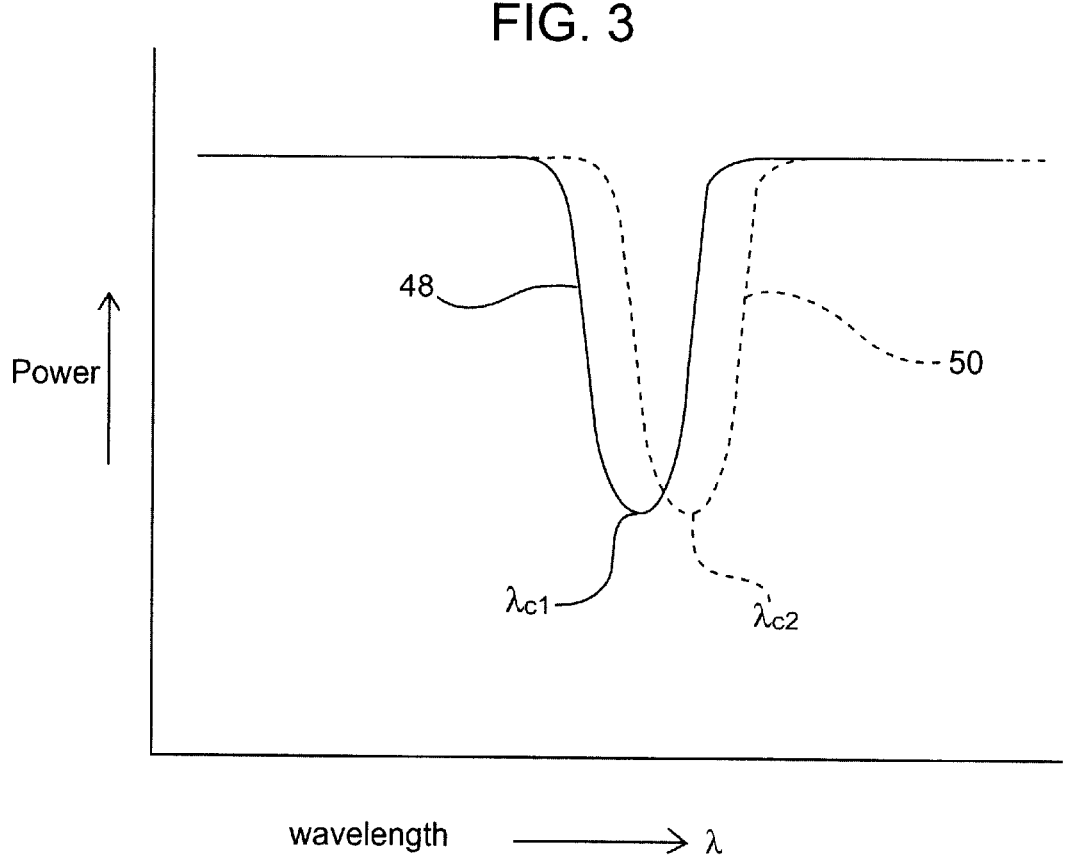
FIG. 3 is a graphic representation illustrating control of a wavelength specific property of an optical component under test using the system of FIG. 3.

As noted above, fiber Bragg grating 36 can, inter alia, act as a wavelength specific filter for light transmitted through fiber Bragg grating 36, and control of the spacing of domains 38 of different refractive index will control the wavelength specific transmission characteristics of fiber Bragg grating 36. Referring to FIG. 3, there is shown a graphic representation an exemplary transmission profile for a fiber Bragg grating 36 over a wavelength range extending generally from $\lambda_{min}$ to $\lambda_{max}$. Relative wavelength is shown along the horizontal axis of FIG. 3, while relative transmitted power is shown along the vertical axis.

During scanning, fiber Bragg grating 36 may exhibit a transmission profile as shown by solid curve 48 in FIG. 3, which has a central wavelength $\lambda_{C1}$ corresponding to a minimum transmission resulting from the grating effect of regions 38 of different refractive index. This $\lambda_{C1}$ is noted by detector 16 and communicated to system controller 18. The optimum, desired wavelength for the minimum transmission of fiber Bragg grating 36 may, however, be centered at a different wavelength $\lambda_{C2}$. System controller 18 may then direct tensile force applicator 46 in process control unit 20 to apply a force F to fiber Bragg grating 36, during scanning, such that the length of fiber Bragg grating 36 and the spacing of domains 38 is increased, resulting in the minimum transmission of fiber Bragg grating 36 being correspondingly shifted to the desired wavelength $\lambda_{C2}$, as is shown by dashed curve 50.

Once fiber Bragg grating 36 is suitably elongated and positioned to provide a transmission minimum at $\lambda_{C2}$ as described above, system controller directs UV cure assembly 44 to apply adhesive to second end 42 of fiber Bragg grating 36, and then expose the adhesive to UV light to cure the adhesive and affix second end 42 of fiber Bragg grating 36 into its packaging or housing (not shown). The application and curing of the adhesive effectively locks fiber Bragg grating 36 into a position which maintains the desired $\lambda_{C2}$ as the minimum transmission for fiber Bragg grating 36.

The above described operations of applying a tensile force F to fiber Bragg grating 36 to adjust the wavelength of the transmission minimum, and then applying and curing adhesive to preserve the adjusted property, are carried out in real time during scanning. The invention thus allows real time process control of the wavelength specific transmission minimum of fiber Bragg grating 36. The scanning of fiber Bragg grating 36 and detecting output from fiber Bragg grating 36 are carried out relatively rapidly, and the rate limiting step to the above sequence of events is generally application and UV curing of the adhesive to hold fiber Bragg grating 36 in its adjusted position.

System controller 18 may direct or control scanning of fiber Bragg grating 36 according to feedback from detector 16 and/or feedback from process control unit 20. Thus, the scanning of fiber Bragg grating 26 may be slowed, interrupted, repeated, or otherwise changed or controlled as required to optimize the real time processing operations carried out on fiber Bragg grating 36.

The wavelength specific transmission characteristics of fiber Bragg grating 36 can also be adjusted by applying a suitable compressive force on fiber Bragg grating to reduce the distance between domains 38. However, fiber Bragg gratings generally exhibit poor compressive strength. Thus, application of compressive force to a fiber Bragg grating to control wavelength specific transmission characteristics, while considered to be within the scope of the invention, is presently less preferred.

The specific example using a Fiber Bragg grating as described above and shown in FIG. 3 is only exemplary, as related above, and the invention is intended for use with any passive or active optical component which may have a wavelength specific property which can be adjusted or tested during manufacture. For example, in the case of various optical coatings such as anti-reflection coatings, processing control unit 20 may comprise a coating or film deposition chamber and/or assembly, with scanning of the optical component carried out during coating deposition. Scanning of the component and detection of optical output from the component may be carried out in reflection as a coating is deposited, with the thickness of the coating controlled during deposition by system controller according to feedback from detector 16. Scanning may be slowed, interrupted, repeated or other wise controlled by system controller during coating deposition. The invention may be used with various other optical components and devices which will suggest themselves to those skilled in the art upon review of this disclosure, and which are considered to be within the scope of the present invention.

Figure 4:
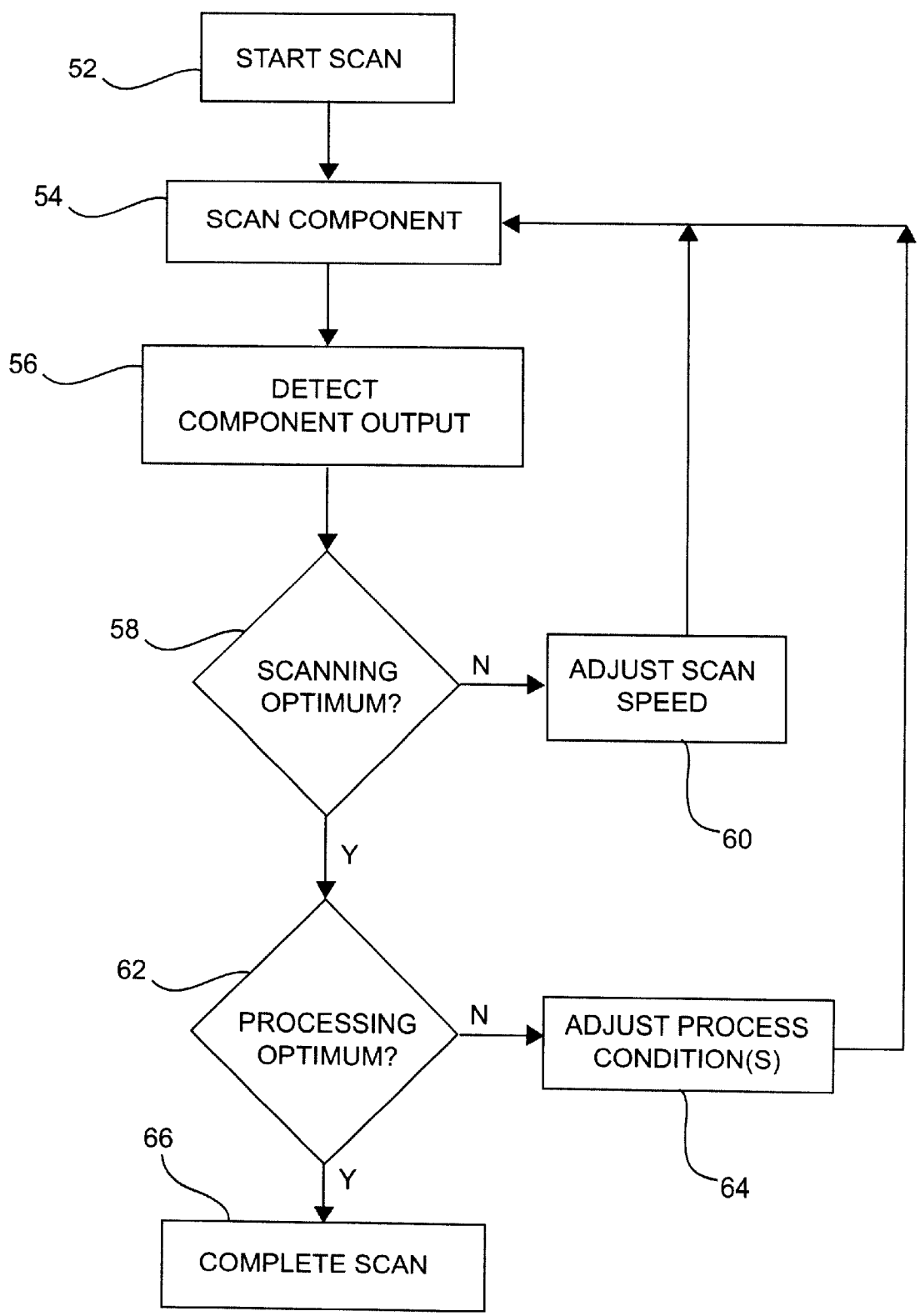
FIG. 4 is a flow diagram illustrating generally the method of the invention.

Referring now to the flow chart shown in FIG. 4, as well as FIG. 1 through FIG. 3, the method of the invention will be more fully understood. The order of the events shown in FIG. 4 may be altered in many aspects, and thus should not be considered limiting.

In event 52, scanning by linearly tunable semiconductor laser 12 is initiated or started. Generally, this event involves selection of a wavelength range for tunable laser 12, and then powering or activating tunable laser 12 such that optical output from laser 12 occurs. Prior to event 52, optical component will be optically coupled to tunable laser 12 and detector 16 in the manner described above.

At event 54, optical component 14 is scanned by tunable laser 12. This event generally involves the directing of optical output from tunable laser 12 to optical component 14 so that the optical output of laser 12 interacts with component 14 via transmission, reflection or otherwise. In the case of fiber Bragg grating 36, scanning is carried out by transmitting the optical output of laser 12 through fiber Bragg grating 36.

At event 56, optical output from component 14 is detected by optical detector 16. Detecting event 56 occurs generally concurrently with scanning 54. The output from optical component 14 to detector 16 will generally include information regarding a wavelength specific property of component 14. In the example above utilizing fiber Bragg grating 36, the wavelength specific transmission minimum is detected as described above. Output from detector 16 is communicated to system controller 18.

At event 58, a query is made, generally by system controller 18, as to whether the scanning of component 14 is being carried out optimally. The terms "optimal" and "optimum" as used in this regard mean generally that scanning conditions are acceptable with regard to a predetermined standard or standards. Evaluation of scanning conditions by system controller 18 may be made according to feedback from detector 16, feedback from process control unit 20 and/or internal programming. The evaluation of scanning conditions in event 58 is generally concurrent to and on-going with the scanning of component in event 54 and the detecting of component output in event 56.

If the scanning of component as described in event 58 is non-optimal or otherwise unacceptable, event 60 may occur wherein scanning conditions are adjusted. Scanning adjustment may involve interruption or delay of scanning, repeat of scanning event 54, increasing or decreasing scanning speed and/or other adjustment as required for optical characterization of a wavelength specific aspect of component 14. Adjustment of scanning conditions in event 60 is generally carried out by system controller 18 according to feedback from detector 16 and/or feedback from process control unit 20, as noted above. Following adjustment of scan conditions in event 60, scanning of component 14, detection of output from component 14, and evaluation of scanning conditions in events 54, 56, 58 are again carried out.

If the scanning of component related in event 58 is optimal, event 62 generally occurs wherein a query is made as to whether processing conditions associated with one or more wavelength specific aspects of optical component 14 are optimal. Once again, the terms "optimal" and "optimum" as used in this regard mean generally that processing conditions are acceptable according to a predetermined standard or standards. This query is generally made by system controller 18, and is resolved according to feedback to system controller 18 from detector 16 and from process control unit 20. Event 58 occurs generally concurrently with, and is generally on-going with events 54, 56, 58 and 60.

If processing associated with a wavelength-specific aspect or property of component 14 is non-optimal, event 64 occurs wherein system controller 18 directs processing control unit 20 to adjust processing conditions to alter the wavelength specific property of component 14. In the above specific example using fiber Bragg grating 36, the wavelength specific transmission minimum is adjusted or altered by applying a tensile force to the fiber Bragg grating 36, and then applying and curing an adhesive to retain the fiber Bragg grating 36 in its adjusted configuration. This event may be on-going and occurs generally concurrently with events 54, 56, 58, 60 and 62.

If the processing of component 14 is optimal in event 62, event 66 occurs wherein scanning of component 14 is completed. In event 66, the processing of component is also completed. Following event 66, the optical component 14, which will now have an adjusted or characterized wavelength-specific property, may be removed from the system 10 and a new optical component 14 may be replaced therefor, and the above events repeated, to provide for real time process control of another optical component. As noted above, events 54, 56, 58, 60, 62 and 64 are on-going and generally occur concurrently, and the particular order of the events as described above and shown in FIG. 4 may be altered and is not limiting.

In another presently preferred embodiment of the invention, post processing evaluation may be carried out on an optical component without providing process control. In this embodiment, process control unit 20 may be omitted. The optical component 14 is scanned, and its output is detected and communicated to system controller 18 as described above. The wavelength specific property or properties of the component 14 are determined by system controller 18, according to output from detector 16, but no processing operations are carried out on the component 14 to alter or change the wavelength specific property. This embodiment of the invention may be used for quality control or quality assurance purposes in association with a previously prepared optical component.

In yet another presently preferred embodiment of the invention, system controller 18 may comprise a human operator working with an oscilloscope or like device. Output from detector 16 is directed to the oscilloscope, and the operator evaluates the wavelength specific properties of optical component 14 via the oscilloscope according to feedback from the detector 16. The operator may then manually direct operation of process control 20 to adjust or tailor the wavelength-specific property of the component 14.

Figure 5:
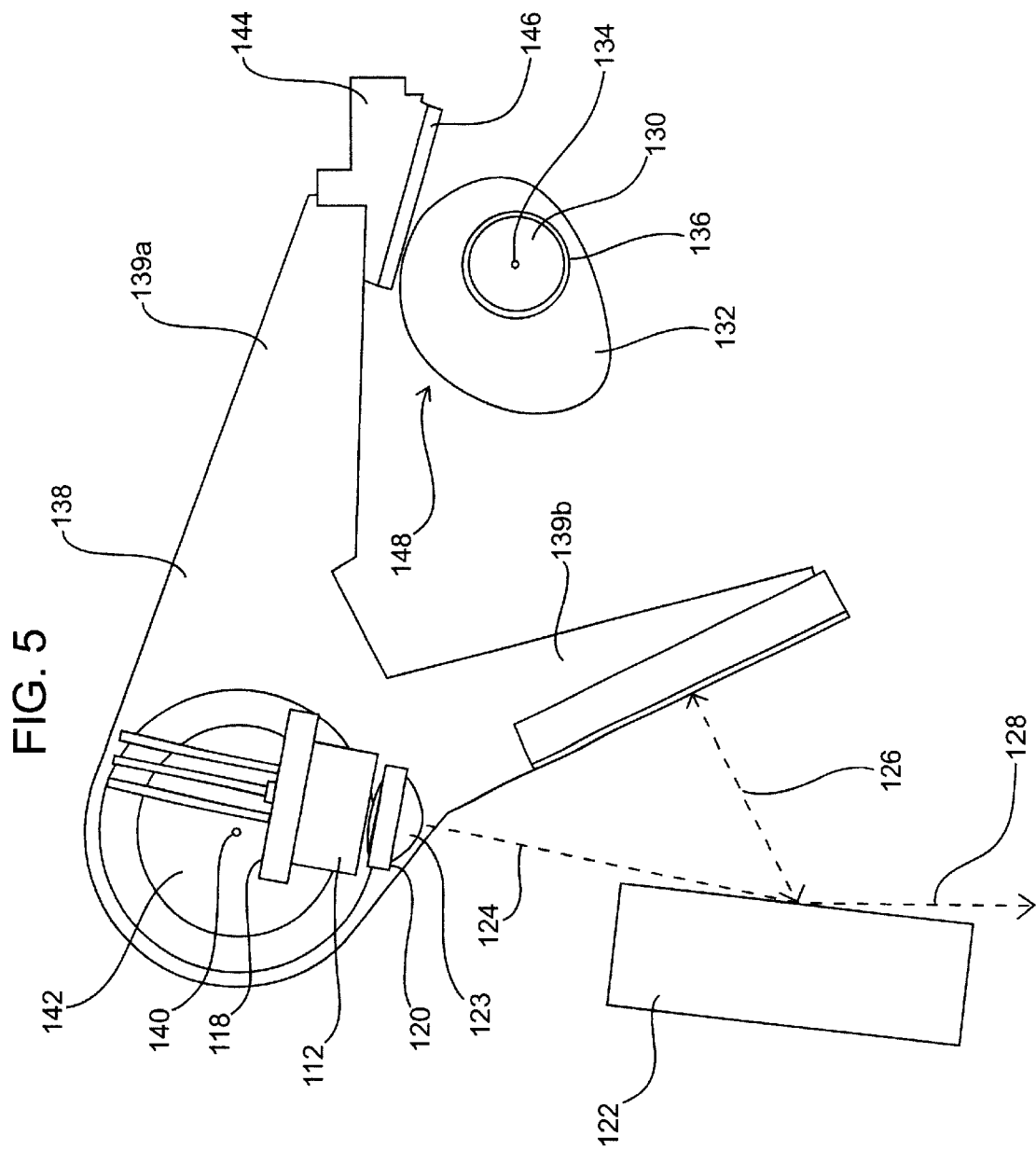
FIG. 5 is a schematic top plan view of a first embodiment of a linearly swept tunable laser in accordance with the present invention.

As noted above, several tunable laser sources may be used with the present invention. Referring now to FIG. 5, a first preferred embodiment of a linearly swept tunable laser apparatus 110 in accordance with the invention is generally shown, which may be used for the fast, linearly swept or linearly tunable semiconductor laser (LTLS) 12 in system 10 or system 34. The apparatus 110 is a tunable external cavity diode laser (ECDL) which comprises generally a solid state or diode laser device 112, a movable reflective or retroreflective tuning element 114, and a tuning drive assembly 116 associated with movable reflective element 114. Solid state laser 112 may comprise a variety of conventional semiconductor laser devices, and will have generally a reflective rear facet 118, a front or emission facet 120, and a laser active region (not shown) positioned therebetween. Movable reflective element 114 preferably comprises a mirror or prism.

Solid state laser 112 is stationary with respect to movable reflective element 114. Movable reflective element 114 defines a first end of an external laser cavity. The reflective rear facet 118 of laser 112 defines a second end of the laser cavity. A retroreflective dispersive element such as a diffraction grating 122 is positioned within the laser cavity between laser 112 and movable reflective element 114. A collimating lens 123 collimates light output 124 from solid state laser 112. The collimated light 124 is directed towards diffraction grating 122 at an angle such that a first order diffraction 126 is directed towards movable reflective element 114. Reflective element 114 reflects or returns the first order diffracted light 126 to grating 122, which returns light through lens 123 to solid state laser 112 via a second diffraction. The external cavity laser apparatus 110 provides a laser output beam 128 as the zeroth-order diffraction from grating 122. As shown, diffraction grating 122 is positioned to define an external laser cavity of the Littman-Metcalf type configuration wherein the laser cavity is "folded".

Drive assembly 116 comprises a drive motor 130 and a cam body 132 coupled to motor 30 by a rotating drive shaft 134. Drive motor 130 is preferably a brushless DC motor, and is operatively coupled to an external DC power source (not shown). A rotational encoder 136 is included with drive motor 130 which counts rotations of drive shaft 134. Drive motor 130 preferably is fixedly mounted on a base or support (not shown).

Movable reflective element 114 is mounted on a pivoting actuator arm member or element 138. Actuator arm member 138 may comprise a variety of structures and configurations, and is shown in a presently preferred configuration wherein a first extension 139a is associated with cam body 132, and a second extension 139b is coupled to movable reflective element. Actuator arm member 138 is pivotally mounted on a base or support (not shown) at pivot point 140 via a pintle or pivot element 142 such that actuator arm member 138 moves pivotally about pintle element 142 and pivot point 140. A cam follower element 144 is coupled to arm 139a of arm member 138 and is positioned adjacent cam body 132 of drive assembly 116. Preferably, a cam follower pad 146 comprising a low wear, low friction coefficient material is included on cam follower element 144 adjacent the camming surface 148 on cam body 132. Actuator arm member 138 and cam follower element 144, together with drive assembly 116, provide a tuning mechanism for the apparatus 110.

In operation, drive motor 130 rotatably drives cam body 132, and the eccentric shape of cam body 132 results in the exertion of a force by camming surface 148 against cam follower pad 146 and cam follower element 144. The force thus exerted causes the attached actuator arm member 138 to pivot about pintle element 142, and results in movement of mirror 114. Actuator arm 138 is a single, integral mechanical entity, and the pivotal movement of extension 139a and cam follower 144, in response to rotation of cam body 132, introduces a corresponding movement to extension 139b and reflective element 114. The rotational motion of reflective element 114 serves to increase or decrease the angle of the reflected wave from diffraction grating 122 to effect tuning of the wavelength of output beam 128. Counterclockwise rotation of reflective element 114 and actuator arm 38 provides a longer output wavelength, while clockwise rotation produces a shorter output wavelength. The operational wavelength of output beam 128 is primarily determined by the angular relationship of movable reflective element 114 with respect to diffraction grating 122. The lineal or translational motion of reflective element 114 is used to maintain the optical pathlength of the external resonant cavity at a fixed, integral multiple of half-wavelengths of the output wavelength.

In use with system 10 or system 34 as described above, the output beam 128 is optically coupled to optical component 14 or fiber Bragg grating 36 via optical interface 22 in the manner described above.

Figure 6:
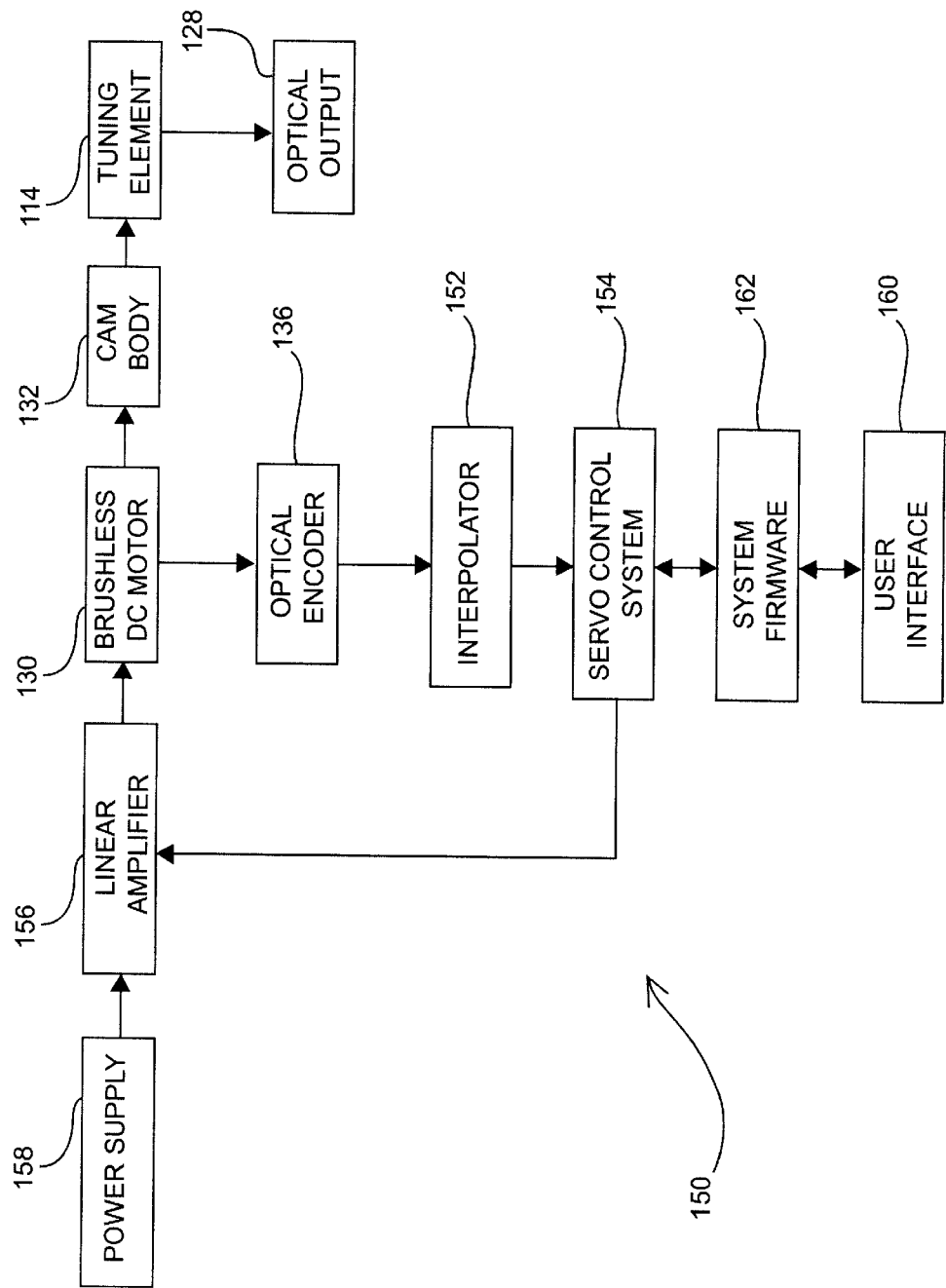
FIG. 6 is a functional block diagram of a tunable laser system using the tunable laser apparatus of FIG. 5.

Referring also to FIG. 6, the external cavity laser apparatus of the invention is preferably utilized with a laser tuning system 150, which is shown generally as a functional block diagram wherein like reference numbers denote like parts. The optical rotational encoder 136 on brushless DC motor 130 is operatively coupled through an interpolator 152 to a servo control system 154. Servo control system 154 is operatively coupled to a linear amplifier 156, which is powered by a linear amplifier power supply 158. Servo control system 154 is operatively coupled to user interface 160 through system firmware 162. Encoder 136 optically monitors rotation of motor 130 and provides feedback to servo control system 154 via interpolator 152. Servo control system 154 directs the operation of motor 130 via linear amplifier 156 according to the feedback from encoder 136. Motor 130 drives cam body 132 to move tuning element 114 to provide optical output 128 at a desired tuned wavelength. User interface 160 accesses servo control system 154 via system firmware 162. The use of a linear amplifier 156 with the invention is preferred over more commonly used pulse width modulation (PWM) amplifiers, as PWM amplification tends to result in a higher level of noise in optical output 128.

The structure and configuration of cam body 132 can be varied as desired to provide a desired tuning rate. The use of an eccentric cam body 132 to control movement of reflective tuning element 114 advantageously allows precise control of both rotational and translational movement of reflective element 114 during tuning. Generally, the change in wavelength with respect to rotational speed ω of motor 130 and cam 132 for output 128 can be described by $$d\lambda/d\omega = C_o$$

where λ=wavelength, t=time, ω=rotational speed of motor 130, and $C_o$=a constant determined according to the structure and configuration of cam body 132.

Cam 132 may alternatively be designed to provide tuning speeds and predictability which are characterized in frequency v instead of wavelength λ. In this regard, cam 132 would be structured and configured to provide a constant tuning speed equal to dv/dω. It should be readily understood that a cam 132 which is configured to provide a constant dλ/dω will differ slightly in shape from a cam 132 configured to provide a constant dλ/dω.

Figure 7:
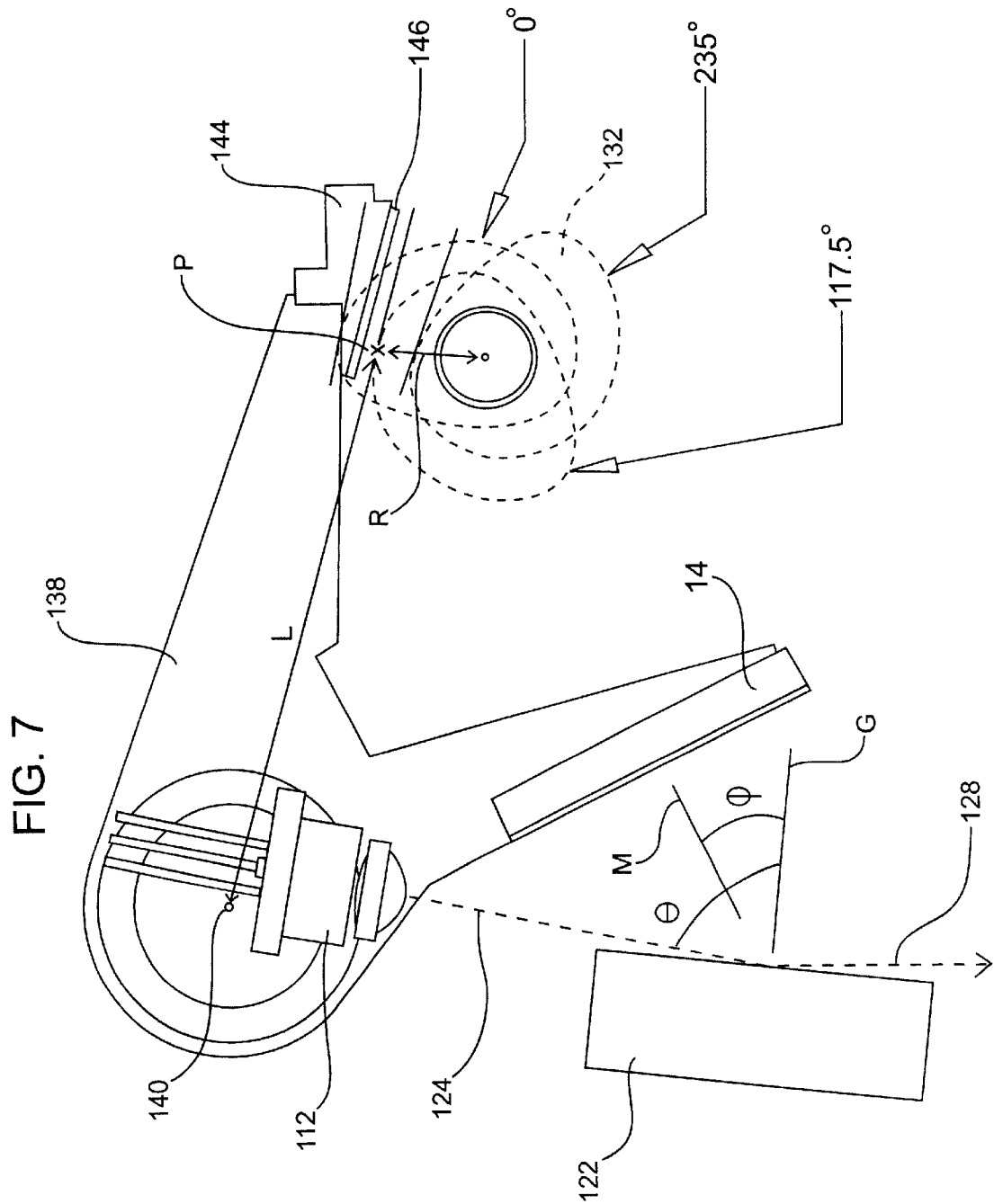
FIG. 7 is a schematic top plan view of the external laser cavity apparatus of FIG. 5 which illustrates the motion of the cam body and actuator arm during tuning.
Figure 8:
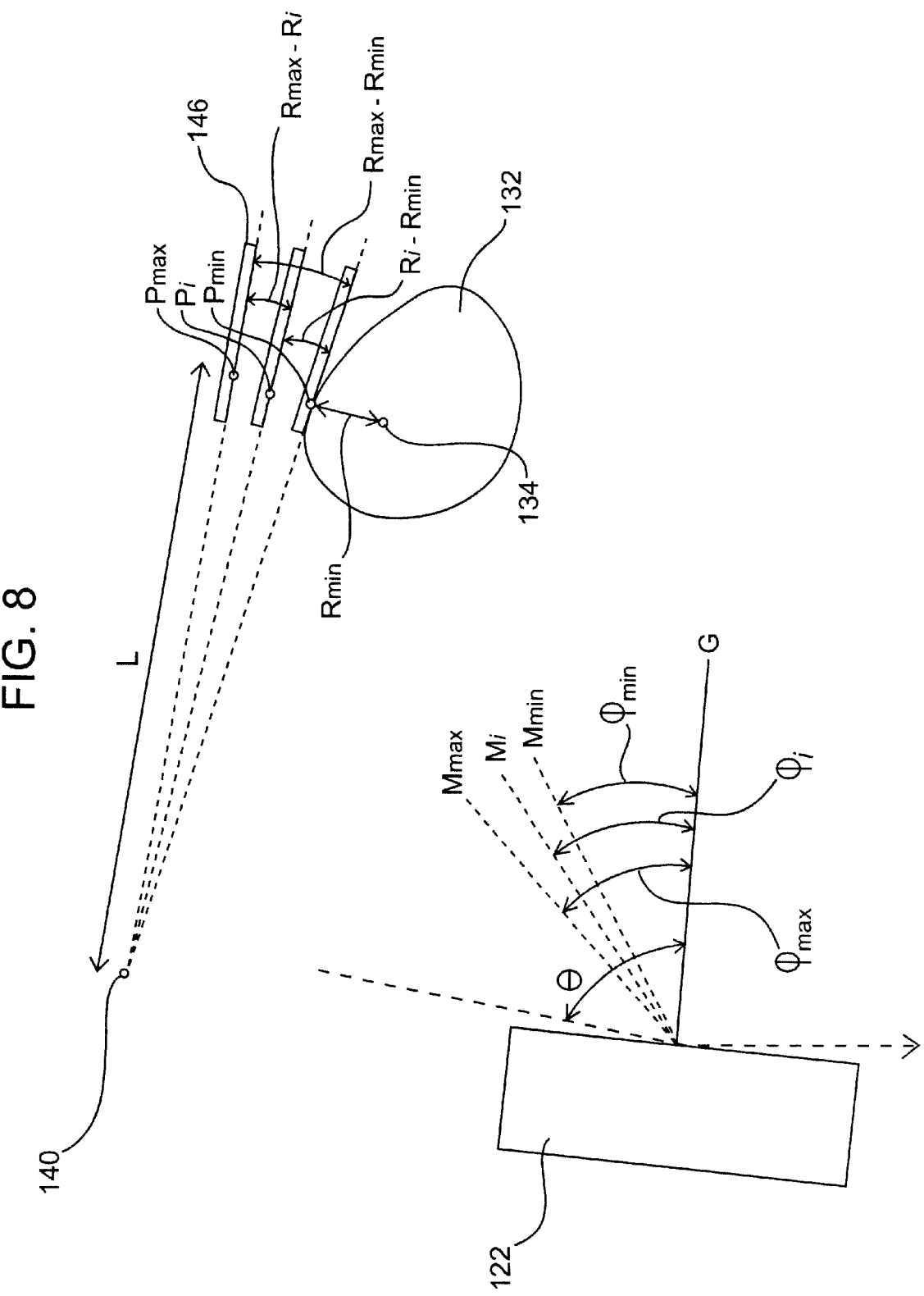
FIG. 8 is a schematic representation of selected angular and positional relationships associated with the tuning motion shown generally in FIG. 7.

Referring more particularly to FIG. 7 and FIG. 8, the tuning of output wavelength 128 of the apparatus 110 with respect to the rotational movement of cam body 132 and angular position of mirror 114 is illustrated. In FIG. 7 and FIG. 8, the distance L represents the distance between pivot point 140 and the point-of contact P between cam surface 148 and cam follower pad 146. The radius of cam 132 is shown by R, which will vary according to the eccentricity of cam body 132 as cam body rotates. Line M is a line normal to the surface of mirror 114. Line G is a line normal to the surface of grating 122. Angle θ represents generally the angle between input beam 124 from laser 112 and line G normal to grating 122. Angle φ represents generally the angle between the line M normal to mirror 114 and the line G normal to grating 122.

With the above in mind, the output wavelength $\lambda_i$ for a particular angle $\phi_i$ can be shown by $$\sin \phi_i = \lambda_i g - \sin \theta$$

or $$\lambda_i = (\sin \phi_i + \sin \theta)/g,$$

where $\lambda_i$ is in microns, and g=the grating density of diffraction grating 122 in microns. For the ECDL apparatus 110, the angle θ is preferably maintained at approximately 85°, and grating density g is preferably one line per micron. The ECDL apparatus 110 provides tuning of output wavelength over a range extending from $\lambda_{min}$ (shortest output wavelength) to $\lambda_{max}$ (longest wavelength) with a range of angular movement of mirror 114 corresponding to minimum and maximum angles $\phi_{min}$ and $\phi_{max}$ respectively. For a particular angle $\phi_i$, the angular movement with respect to $\phi_{min}$ can be shown by $$\sin \phi_i - \sin \phi_{min} = [\lambda_i g - \sin \theta] - [\lambda_{min} g - \sin \theta],$$

or, more conveniently, by $\phi_i-\phi_{min}=\sin^{-1}[\lambda_i g-\sin\theta]-\sin^{-1}[\lambda_{min} g-\sin\theta]$.

Since cam follower 144, actuator arm member 138, and mirror 114 comprise a single mechanical entity as noted above, cam follower 144 undergoes a corresponding movement with respect to the angular movement of mirror 114. Thus, as mirror 114 undergoes angular motion, the point of contact P adjacent cam surface 148 undergoes a translation shown (to the first order) by $\sin(\Delta\phi)\approx\Delta R/L$, where R is the radius of cam 132 at contact point P during tuning, and where L is the distance between pivot point 40 and contact point P as noted above. The tuning motion of apparatus 110 can thus be expressed in terms of cam radius R and distance L by $(R_i-R_{min})/L=\sin(\phi_i-\phi_{min})=\sin\{\sin^{-1}[\lambda_i g-\sin\theta]-\sin^{-1}[\lambda_{min} g-\sin\theta]\}$ where $R_{min}$ is the radius of cam 132 for the point of contact $P_{min}$ corresponding to angle $\phi_{min}$ and output wavelength $\lambda_{min}$, and $R_i$ is the radius of cam 132 for the point of contact $P_i$ corresponding to angle $\phi_i$ and output wavelength $\lambda_i$, as shown in FIG. 8.

In one specific example for ECDL apparatus 110, cam body 132 is structured and configured to mechanically provide a tuning range of between $\lambda_{min}$=1475 rum and $\lambda_{max}$=1585 nm. In FIG. 7, cam 132 is shown in three positions corresponding to cam rotational angles $\psi_{min}$=0° for $\lambda_{min}$=1475 nm, and $\psi_{max}$=235° for $\lambda_{max}$=1585 nm. An intermediate position for cam 132 is also shown at $\psi_i$=117.5° for $\lambda_i$=1530 nm. The positions shown in FIG. 8 shown for $M_{min}$, $M_i$, $M_{max}$, $\phi_{min}$, $\phi_i$, $\phi_{max}$, and $P_{min}$, $P_i$, $P_{max}$ correspond respectively to the $\psi_{min}$, $\psi_i$, $\psi_{max}$ of FIG. 7. The angular and positional relationships shown in FIG. 7 and FIG. 8 and described above may alternatively be characterized in terms of frequency, rather than wavelength, as previously related.

Table 1 shows output wavelength in increments of five nm for corresponding cam rotational angle $\psi$ and angle $\phi$.

TABLE 1

| Wavelength (nm) | Cam Angle Ψ | Angle φ |
|---|---|---|
| 1475 | 0 | 28.60740343 |
| 1480 | 10.68182 | 28.93422866 |
| 1485 | 21.36364 | 29.26208774 |
| 1490 | 32.04545 | 29.59100141 |
| 1495 | 42.72727 | 29.92099084 |
| 1500 | 53.40909 | 30.25207771 |
| 1505 | 64.09091 | 30.58428422 |
| 1510 | 74.77273 | 30.91763309 |
| 1515 | 85.45455 | 31.25214758 |
| 1520 | 96.13636 | 31.58785153 |
| 1525 | 106.8182 | 31.92476938 |
| 1530 | 117.5 | 32.26292616 |
| 1535 | 128.1818 | 32.60234755 |
| 1540 | 138.8636 | 32.9430599 |
| 1545 | 149.5455 | 33.28509024 |
| 1550 | 160.2273 | 33.62846631 |
| 1555 | 170.9091 | 33.97321661 |
| 1560 | 181.5909 | 34.31937041 |
| 1565 | 192.2727 | 34.66695777 |
| 1570 | 202.9545 | 35.01600962 |
| 1575 | 213.6364 | 35.36655774 |
| 1580 | 224.3182 | 35.71863484 |
| 1585 | 235 | 36.07227456 |

The angle θ is 85°, and the grating density g is 1 line per micron, for each wavelength shown in Table 1. The data shown in Table 1 may alternatively be shown in terms of frequency, rather than wavelength, as noted above.

Figure 9:
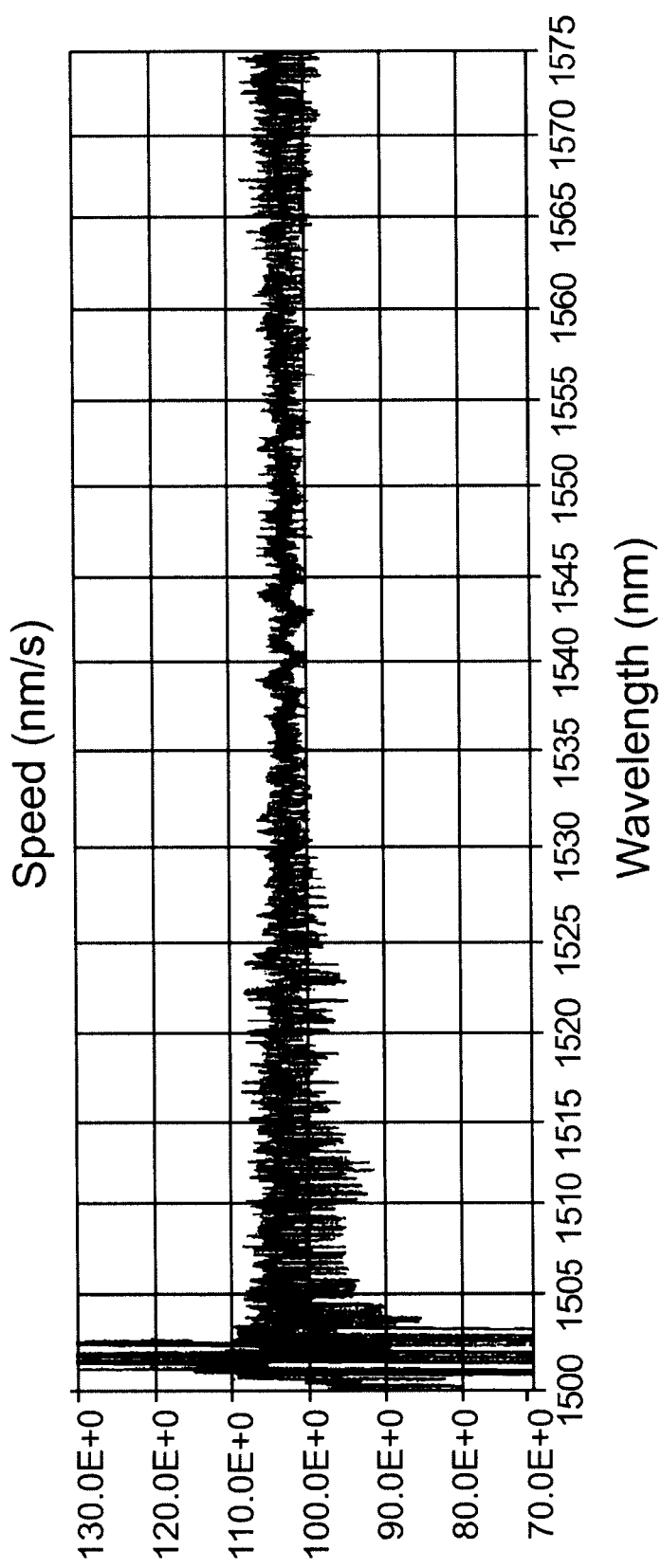
FIG. 9 is a graphical representation of tuning speed versus tuning wavelength for the external cavity laser apparatus of FIGS. 5 and 7, wherein tuning speed in nanometers per second is shown along the vertical axis, and wavelength in nanometers is shown along the horizontal axis.

Referring to FIG. 9, the presently preferred drive motor 130 is a Maxon Model 118888 brushless DC motor. The Maxon motor provides both high reliability and low cogging torque. Cogging torque is introduced by the interaction of permanent magnets in the rotor with stator teeth. The net effect of this interaction is a "cogging" action which adds noise to the tuning action. Various other DC motors may be used with the invention, but the Maxon motor has so far provided the smallest amount of noise during tuning.

In FIG. 9 there is shown a graphical representation of tuning speed versus tuning wavelength for the external cavity laser apparatus 110 of FIG. 9 using the preferred Maxon brushless DC motor. Speed in nanometers per second is shown along the vertical axis, and wavelength in nanometers is shown along the horizontal axis. In the preferred embodiment, the Maxon motor provides a tuning rate of 110 nm/235°, or about 0.48 nm per degree of motor angle for the above specific example. Thus, operating the Maxon motor with cam 132 at a rotation rate of 250° per second yields a tuning rate of about 100 nm per second in this specific example. This rate corresponds to about 0.694 revolutions per second (RPS), or 41.6 rotations per minute (RPM), which results in very low noise levels during tuning.

Figure 10:
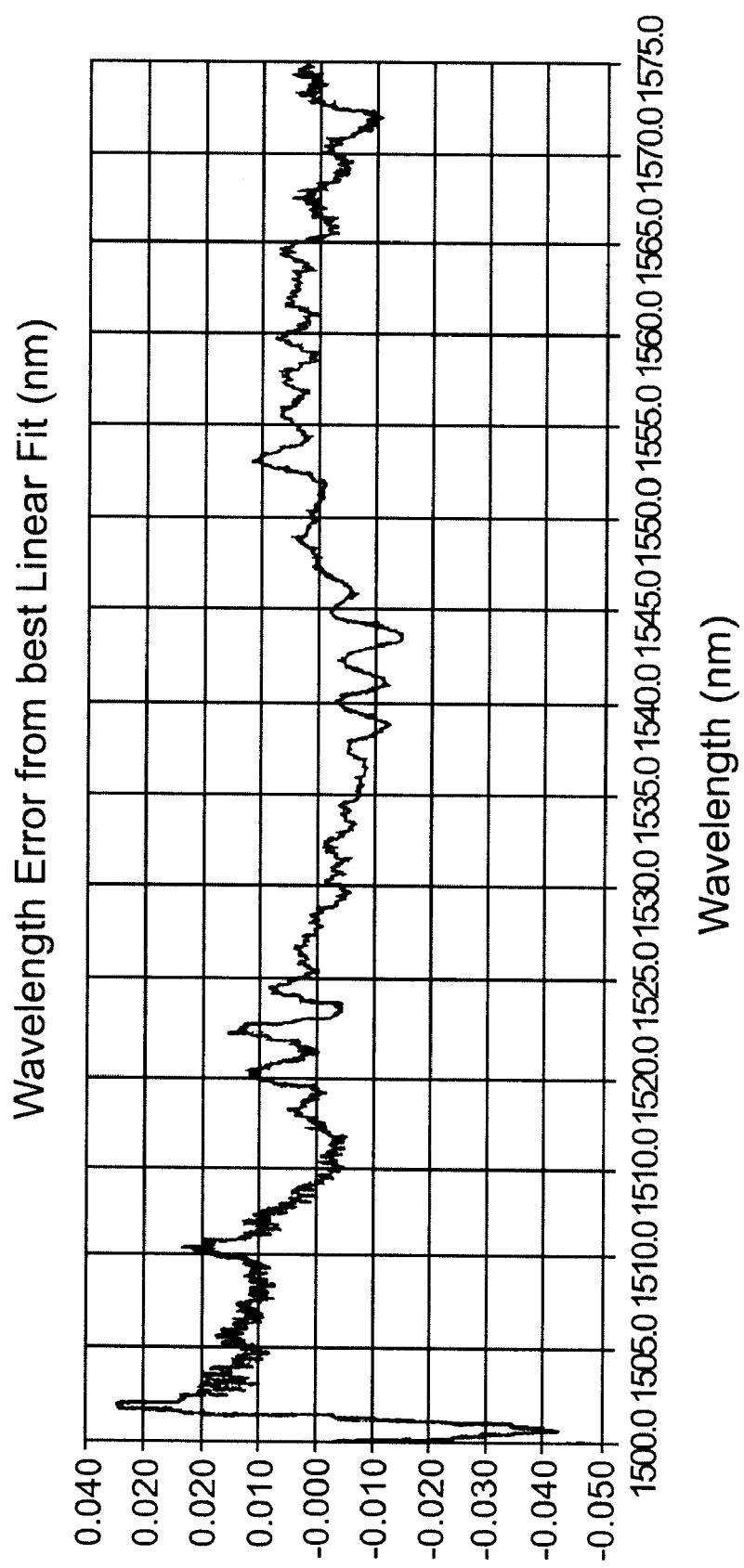
FIG. 10 is a graphical representation of wavelength error versus tuning wavelength for the external cavity laser apparatus of FIGS. 5 and 7, wherein wavelength error from best linear fit is shown along the vertical axis, and wavelength in nanometers is shown along the horizontal axis.

In obtaining the data shown in FIG. 9 and FIG. 10, output from laser 112 of apparatus 110 was directed through a Fabry-Perot interferometer (not shown) with a FSR (Free Spectral Range) of about 6 pm (picometers). A Frequency Domain Analyzer or FDA (not shown) was used to count the number of fringes per second while motor 130 and cam 132 drove arm 138 and mirror 114, with sampling carried out every 250 microseconds. The FDA tuning rate was determined in fringes per second, which were then converted to nanometers per second. As can be seen in FIG. 9, the tuning speed over the entire 1500–1575 nm range remains generally greater than 100 nm/sec.

FIG. 10 is a graphical representation of wavelength error versus tuning wavelength for the external cavity laser apparatus 110 of FIG. 5 using the Maxon motor described above at a tuning rate of 100 nm/sec. Wavelength error from best linear fit is indicative of tuning linearity, and is shown in nanometers along the vertical axis, with wavelength in nanometers being shown along the horizontal axis. In the 1512–1575 nm range, a relatively low wavelength error (from best linear fit) of ±0.01 is provided. The apparatus 110 can further provide an even lower wavelength error from best linear fit) of ±0.001 under various other tuning speeds and tuning ranges. The high predictability and high linearity of the laser output wavelength with respect to motor angle as shown in FIG. 10 reduces the level of electronic feedback necessary for control of the output wavelength. Thus, the invention does not require use of very fast electronic or mechanical corrections to achieve a linear tuning rate. This, in turn, allows for higher tuning speeds, as the invention is not mechanically bandwidth limited.

The preferred Maxon motor can operate at rotational speeds of as high as 17,000 RPM, which corresponds to a tuning rate of about 40,800 nm per second. While the invention provides tuning speeds of up to 40,800 nanometers per second, tuning speeds this high are achieved generally at the expense of increased tuning noise and decreased predictability or linearity of tuning. Particularly, the mechanical dynamics of various aspects of the drive train at very high tuning speeds results in mechanical resonances and other effects which diminish predictability and increase noise levels. Presently, effective tuning rates up to 10,000 nm per second have been achieved with relatively high linearity and low noise using the ECDL apparatus 110 with the Maxon motor as described above. Higher effective tuning rates with low noise and high predictability are expected to be achieved with the apparatus 110 as problems associated with mechanical resonances and other features are overcome.

The ECDL apparatus 110, using the Maxon motor, can also provide high predictability and low noise at very low tuning speeds of as low as 0.001 nm per second. Thus, the apparatus 110 effectively provides tuning speeds in the range of between about 0.001 nm per second, and about 40,000 nm per second. Preferably, the apparatus 110 is used to provide tuning rates of between about 0.001 nm per second and about 10,000 nm per second for the reasons noted above. More preferably, the apparatus 110 is used to provide tuning rates of between about 100 nm per second and about 2,000 nm per second. In the presently preferred embodiments, the apparatus 110 will have a tuning linearity such that a wavelength error of no greater than 0.1 nanometer from best linear fit is provided during scanning, and more preferably of no greater than 0.01 nanometer from best linear fit. Once again, the laser tuning characteristics of the invention, while discussed in terms of wavelength, may alternatively be characterized in terms of frequency.

The above details and specific example, it should be kept in mind, merely provide a specific example of a tunable laser apparatus in accordance with the invention. Thus, the particular tuning ranges and tuning rates described above should not be considered as limiting. The particular structure and configuration of cam 132, actuator arm element 138, and/or the properties of grating 122 and type of drive motor 130, may be varied as desired for use with various types of tunable lasers to provide tuning over various wavelength ranges at a variety of tuning speeds. Semiconductor lasers suitable for use with the invention may be based on, for example, GaAs, AlGaAs, AlGaInP, InGaAs, AlGaInN, InGaAsN, InGaAsP, InP, GaN, or other materials, to allow tuning over various wavelength ranges. Presently, such semiconductor lasers can effectively provide outputs over the range of between about 300 nm to about 2300 nm, and this range will likely increase as new materials and semiconductor laser architectures are developed. The present invention may be used with any of these types of semiconductor lasers, as well semiconductor lasers developed in the future.

In order to achieve good tuning speed linearity with low noise, it is desirable to have a sufficiently high ratio of optical feedback to laser facet reflectivity. As the laser diode chip 112 itself will always have some feedback from its own front facet, there will always exist some competition between the external laser cavity and the internal cavity of diode laser 112. As tuning is carried out, the effect of the diode laser internal cavity feedback will be seen as an oscillating AC signal on top of the DC wavelength change. This effect can be seen in FIG. 9 as an increase in higher frequency noise below around 1520 nm as well as above 1570 nm. The increase in higher frequency noise is related to higher diode laser facet reflectivities.

The onset of instability of an ECDL (in terms of proper single-mode performance) occurs generally when $$R_{facet} \approx R_{external}/\alpha^2,$$

where $R_{facet}$ is the residual reflectivity of the diode laser front facet after antireflection (AR) coating, $R_{external}$ is the total external cavity reflectivity, and $\alpha$ is the laser linewidth broadening factor. This relationship is described in detail in "Axial Mode Instability in Tunable External-Cavity Semiconductor Lasers" by Zorabedian et al. (September, 1993), published by Hewlett-Packard Laboratories, 3500 Deer Creek Road, Palo Alto, Calif., 94304, the disclosure of which is incorporated herein by reference.

In the present invention, the aforementioned high frequency noise is reduced when $$R_{facet} \leq R_{external}/2\alpha^2,$$

Such residual front facet reflectivity ($R_{facet}$) can be achieved through use of a variety of antireflection coating schemes, the designing of which is well known to those skilled in the art. As the need for lower noise tuning linearity increases in the future, the ratio of $R_{external}/R_{facet}$ will have to increase, either through improved antireflection coatings or higher levels of external cavity feedback.

The tribological relationship between cam surface 48 and cam follower pad 146 will affect noise level during tuning. In this regard, several materials for cam follower pad 146 were evaluated for low noise during tuning. Cam 132 is preferably fabricated from "416 SS" stainless steel, and cam interaction surface 148 is finely polished by conventional techniques. The materials considered for cam follower pad 146 included sapphire, "misaligned" (non-optimally aligned) sapphire, silicon nitride, commercial thermal spray coatings, and bronze-impregnated teflon. The coefficient of friction (COF) for these materials was evaluated over a sliding velocity range of between 0.1 mm/sec and 10 mm/sec, and are provided in Table 2.

TABLE 2

| Sliding Velocity, mm/sec | Frequency Hz | Sapphire | Sapphire, misaligned | Silicone Nitride | Thermal Spray Coating | Bronze-Teflon |
|---|---|---|---|---|---|---|
| 0.1 | 0.02 | 0.53 | 0.75 | 0.54 | 0.30 | 0.16 |
| 0.5 | 0.08 | 0.59 | 0.72 | 0.58 | 0.32 | 0.17 |
| 1 | 0.17 | 0.61 | 0.71 | 0.60 | 0.22 | 0.18 |
| 2 | 0.36 | 0.68 | 0.80 | 0.62 | 0.22 | 0.22 |
| 4 | 0.63 | 0.75 | 0.76 | 0.68 | 0.28 | 0.21 |
| 8 | 1.17 | 0.73 | 0.86 | 0.65 | 0.34 | 0.21 |
| 10 | 1.42 | 0.54 | 0.86 | 0.55 | 0.30 | 0.21 |

As can be seen in Table 2, the lowest COF over the entire velocity range was offered by the bronze-impregnated teflon, which was purchased from Coors Tetrafluor of Los Angeles, Calif. The COF of all materials tended to increase with increasing sliding velocity.

The noise properties associated with use of the same materials for cam followed pad 146 together with a "416 SS" cam body 132 with polished cam surface 148 were evaluated over the over a sliding velocity range of between 0.1 mm/sec and 10 mm/sec. The results are shown in Table 3.

TABLE 3

| Sliding Velocity, mm/sec | Frequency Hz | Sapphire | Sapphire, misaligned | Silicone Nitride | Thermal Spray Coating | Bronze-Teflon |
|---|---|---|---|---|---|---|
| 0.1 | 0.02 | no noise | No noise | no noise | no noise | no noise |
| 0.5 | 0.08 | no noise | No noise | no noise | no noise | no noise |
| 1 | 0.17 | no noise | No noise | no noise | no noise | no noise |
| 2 | 0.36 | no noise | Incr noise | no noise | no noise | no noise |
| 4 | 0.63 | incr noise | Incr noise | incr noise | incr noise | no noise |
| 8 | 1.17 | incr noise | Incr noise | incr noise | incr noise | no noise |
| 10 | 1.42 | incr noise | Incr noise | no noise | no noise | no noise |

All material exhibited generally no noise at sliding velocities between 0.1 and 2 mm/sec. The sapphire, "misaligned" sapphire, silicon nitride and thermal spray coating tended to show increasing (incr) noise at sliding velocities above 4 mm/sec. Only the bronze-impregnated teflon resulted in no noise at higher sliding velocities.

The variation of Coefficient of Friction (COF) over time was evaluated for a bronze-impregnated teflon cam follower pad 146 and "416 SS" cam body 132 with polished cam surface 144. Table 4 shows the changes in COF over a 48 hour period.

TABLE 4

| Time (hours) | COF |
|---|---|
| 0 | 0.18 |
| 4 | 0.21 |
| 8 | 0.23 |
| 12 | 0.23 |
| 16 | 0.24 |
| 20 | 0.24 |
| 24 | 0.25 |
| 28 | 0.24 |
| 32 | 0.25 |
| 36 | 0.25 |
| 40 | 0.25 |
| 44 | 0.24 |
| 48 | 0.26 |

As can be seen in Table 4, the COF increased from an initial value of 0.18 to about 0.25 after 24 hours, and remained at about 0.25 thereafter. With the above in mind, the presently preferred material for cam follower pad 146, or an outer surface thereof, is bronze-impregnated teflon such as is available from Coors Tetraflour, Inc. Another material considered for cam follower pad 146 is zirconia ($ZrO_2$), but is presently less preferred due to its cost. Various other low-wear, low-COF materials may be used for cam follower pad 146, as will be readily understood by those skilled in the art. It is also contemplated that various types of coatings or surface treatments can be used on cam surface 148 to avoid or reduce cam wear, including, for example, phosphate coatings or diffusion treatments, carburizing, nitriding, tuffriding, and ion implantation treatment.

Figure 11:
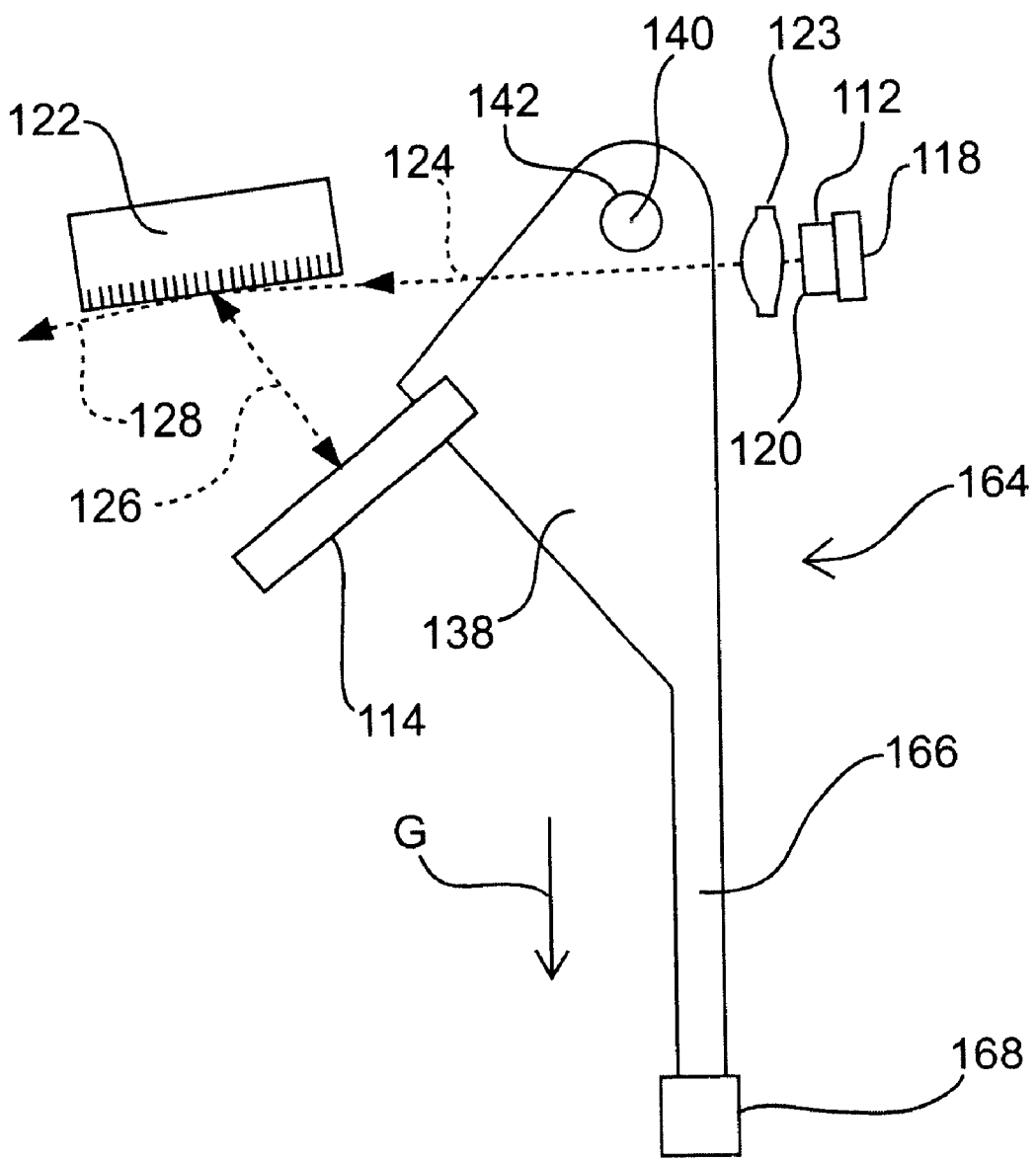
FIG. 11 is a schematic top plan view of a second embodiment of a tunable apparatus in accordance with the present invention.

Referring now to FIG. 11, there is shown a second embodiment external cavity laser apparatus 164 in accordance with the invention, wherein like reference numbers are used to denote like parts. The tunable laser 164 may be utilized in system 10 in applications wherein a highly predictable, quadratic (rather than linear) change in output wavelength is desired during scanning of optical component 14.

As in the apparatus 110 described above, the apparatus 164 comprises a diode laser 112 with a reflective rear face 118 and front emission facet 120. An actuator arm 138 is movably mounted to a base (not shown via a pintle element 142 about pivot point 140. A movable mirror or reflective element 114 is coupled to actuator arm 138. A collimating lens 123 and a stationary diffraction element 122 are positioned in the optical path between laser 112 and movable mirror 114.

Movable mirror 114 and reflective rear facet 118 of laser 112 define a folded laser cavity, with diffraction grating 122 and collimating lens 123 positioned within the laser cavity. Collimated light 124 is directed towards diffraction grating 122 such that a first order diffraction 126 is directed towards movable reflective element 114, and a laser output beam 128 is provided as the zeroth-order diffraction from grating 122, as noted above. Pivotal movement of actuator arm 138 creates a corresponding movement in reflective element 114, and the rotational motion of reflective element 114 serves to increase or decrease the angle of the reflected wave from diffraction grating 122 to effect tuning of the wavelength of output beam 128.

Drive means for actuator arm 138 are provided in the form of a gravity-actuated pendulum assembly comprising a pendulum extension 166 coupled to actuator arm, and a pendulum weight 168 coupled to the end of extension 166, with gravitational force G being used to drive the assembly. In operation, an initial force is laterally applied to weight 168 and extension 166 in order to overcome gravity G and impart an oscillating pivotal motion to actuator arm 138 and mirror 114. The oscillating motion of weight 168, extension 166, actuator arm 138 and mirror 114 will continue with a decreasing amplitude of oscillation, according to air drag on the assembly and friction associated with pintle 142, until the assembly comes to rest.

The external cavity laser apparatus 164 provides a very highly predictable change in the wavelength of laser output 128 during the oscillating motion of mirror 114 in the manner described above. The rate of change in output wavelength is quadratic, rather than linear, due to the use of a gravity driven pendulum for tuning. Various parameters, such as the length of extension 166, size of weight 168, and the initial force applied to weight 168 and extension 166, can be used to change the particular tuning characteristics of the apparatus 164.

Figure 12:
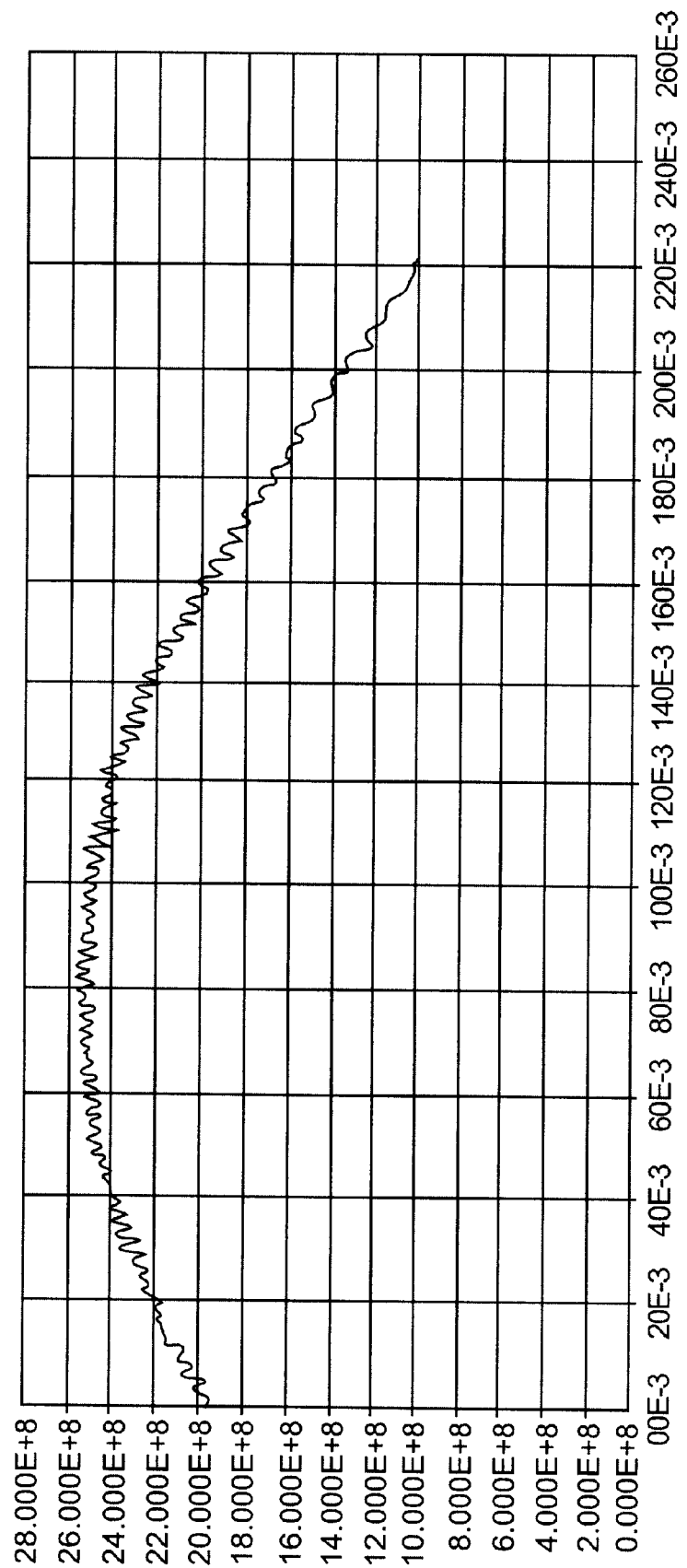
FIG. 12 is a graphical representation of tuning frequency versus time for the tunable laser apparatus of FIG. 11.

FIG. 12 graphically illustrates the change in tuning speed versus time for the apparatus 164 of FIG. 11. Output from laser 112 of apparatus 164 was directed through a Mach-Zehnder interferometer (not shown) with a very small FSR (Free Spectral Range) of about 5 fm (femtometers). A Frequency Domain Analyzer or FDA (not shown) was used to count the number of fringes per second while extension 166, weight 168 and mirror underwent pendular, oscillatory motion, with sampling carried out every 250 microseconds. Thus, the FDA plots the tuning rate for apparatus 164 in terms of fringes per second. FIG. 12 shows the frequency of fringes per time in Hz along the vertical axis, with time (seconds) shown along the horizontal axis. At a tuning rate of 100 nm per second with a 5 fm FSR, a tuning rate of 100 nm per second corresponds to about 20 MHz. As can be seen in FIG. 12, a tuning rate of greater than 100 nm per second is achieved over a substantial portion of the oscillating motion of apparatus 164. The peak of the frequency/time curve of FIG. 8 corresponds approximately to a wavelength of 1550 nm in this embodiment.

Figure 13:
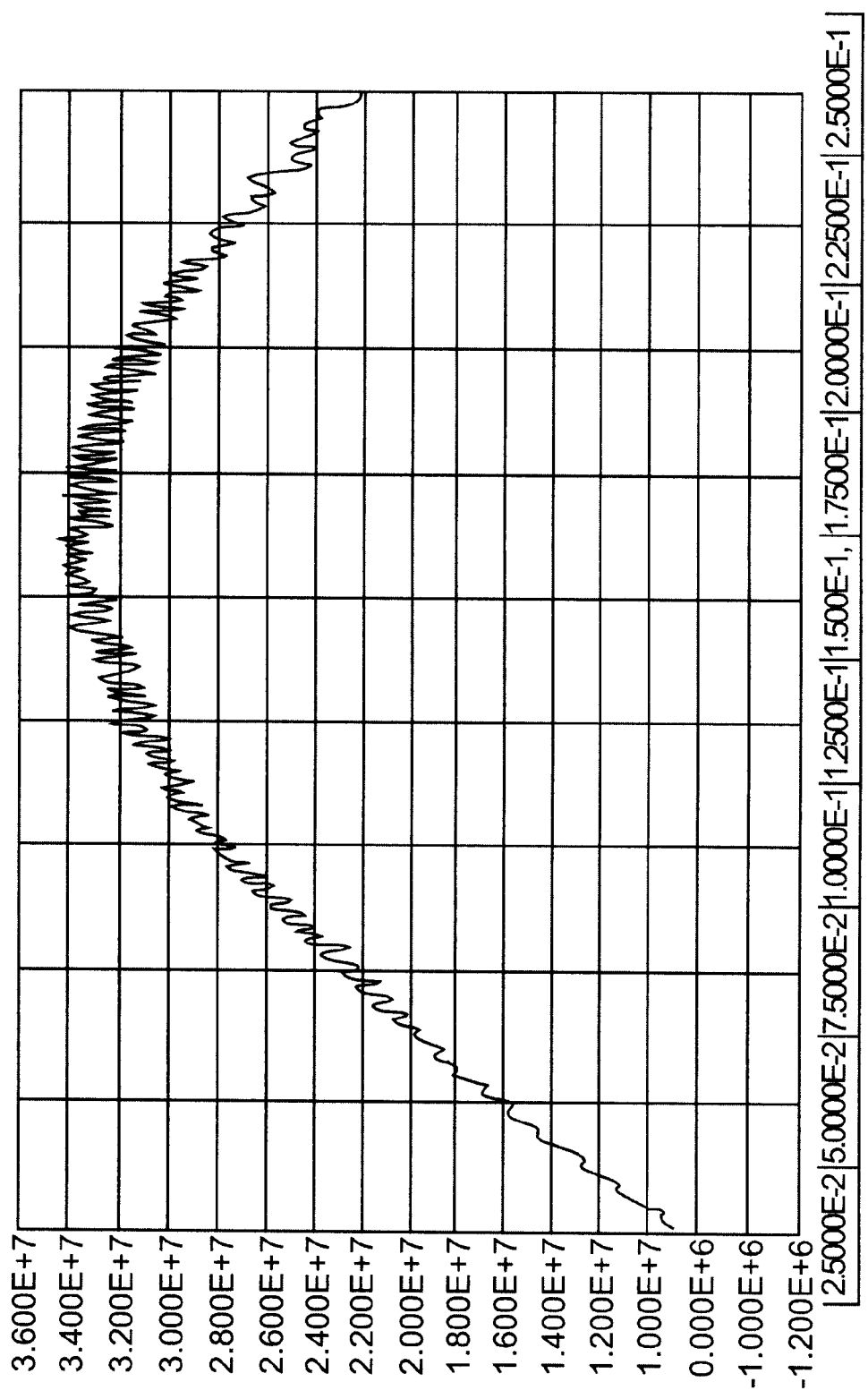
FIG. 13 is another graphical representation of tuning frequency versus time for the tunable laser apparatus of FIG. 11.

Referring now to FIG. 13, another graphical illustration of tuning speed versus time is shown for the apparatus 164. As in FIG. 8, frequency of fringes per time in Hz is shown along the vertical axis, with time in seconds shown along the horizontal axis. In FIG. 13, the peak tuning speed of 34 MHz corresponds to about 170 nm/second tuning speed. Since gravity is the driving force in the tuning mechanism of the pendulum apparatus 164, tuning is achieved with essentially no noise, and with extremely high predictability.

Figure 14:
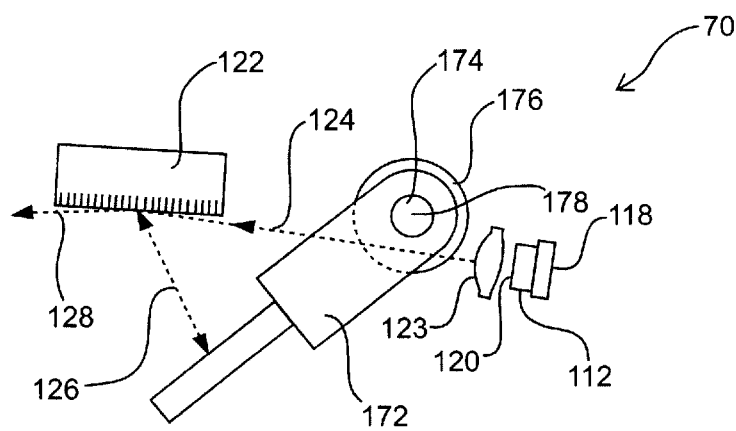
FIG. 14 is a schematic top plan view of a third embodiment of a tunable laser apparatus in accordance with the present invention.

Referring now to FIG. 14, there is shown a third embodiment external cavity laser apparatus 170 in accordance with the invention, wherein like reference numbers are used to denote like parts, which may be used for LTSL 12 in system 10 or system 34 described above. In the apparatus 170, a somewhat shorter actuator arm 172 is coupled directly to the drive shaft 174 of a brushless motor 176, with the pivot point 178 for actuator arm located generally at the center of drive shaft 174. A movable mirror 114 is coupled to the end of actuator arm 172. Movable mirror 114 and reflective rear facet 118 of laser 112 define a folded laser cavity in the manner described above, with diffraction grating 122 and collimating lens 123 positioned within the laser cavity. Collimated light 124 is diffracted off grating 122 such that a first order diffraction 126 is directed towards movable reflective element 114, and the zeroth-order diffraction from grating 122 provides a laser output beam 128, as related above. Pivotal movement of actuator arm 138 creates a corresponding movement in reflective element 114, and the rotational motion of reflective element 114 serves to increase or decrease the angle of the reflected wave from diffraction grating 122 to effect tuning of the wavelength of output beam 128.

In operation, the laser cavity of apparatus 170 is tuned by simple rotation of drive shaft 174, which rotatably moves actuator arm 172 about pivot point 178 and correspondingly moves mirror 114 with respect to grating 122. Since mirror 114 is mechanically interfaced to drive shaft 74 directly through actuator arm 172, very high tuning speeds can be achieved with the apparatus 170. The direct coupling of actuator arm 172 to drive motor generally results in a higher noise level than in other embodiments of the invention due to motor vibration.

Figure 15:
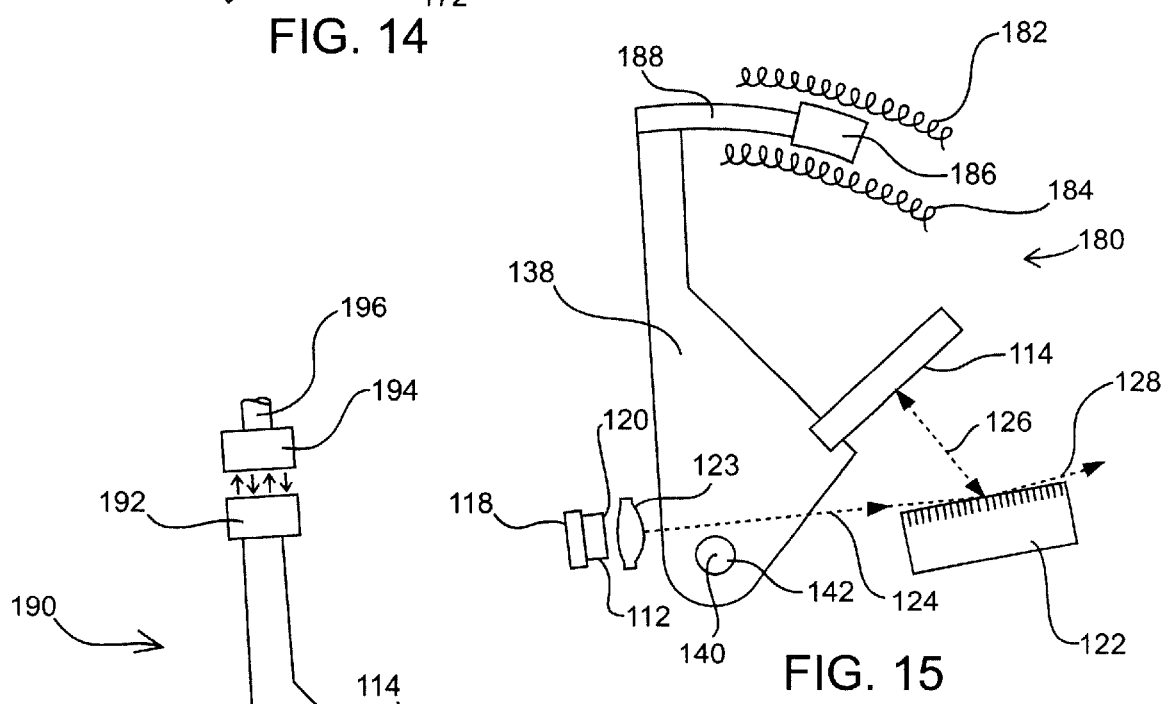
FIG. 15 is a schematic top plan view of a fourth embodiment of a tunable laser apparatus in accordance with the present invention.

Referring next to FIG. 15, there is shown a fourth embodiment external cavity laser apparatus 180, wherein like reference numbers are used to denote like parts, which is suitable for use as tunable laser source 12 in the system 10 or system 34 described above. The apparatus 180 utilizes a drive assembly based on a "voice coil" arrangement comprising two or more helical conductors 182, 184 and a magnet 186 positioned therebetween. Magnet 186 is coupled to actuator arm 138 by a support 188. Helical conductors 182, 184, magnet 186 and support 188 are preferably arcuate in shape in accordance with the pivotal nature of movement of actuator arm 38 about pivot point 140.

For tuning operation, an electric current is introduced to coils 182, 184, which generate a magnetic field proportional to the electric current. The mutually opposing magnetic fields associated with coils 182, 184 and magnet 186 result in movement of magnet 186 in a manner similar to that provided in a conventional voice coil in an audio speaker. The motion of magnet 186 provide a drive force to move actuator arm 138, and hence moves mirror 114 with respect to grating 122, to tune the wavelength of output 128, as described above. There is no physical contact between magnet 186 and coils 182, 184, so the tuning motion is generally noise-free.

Figure 16:
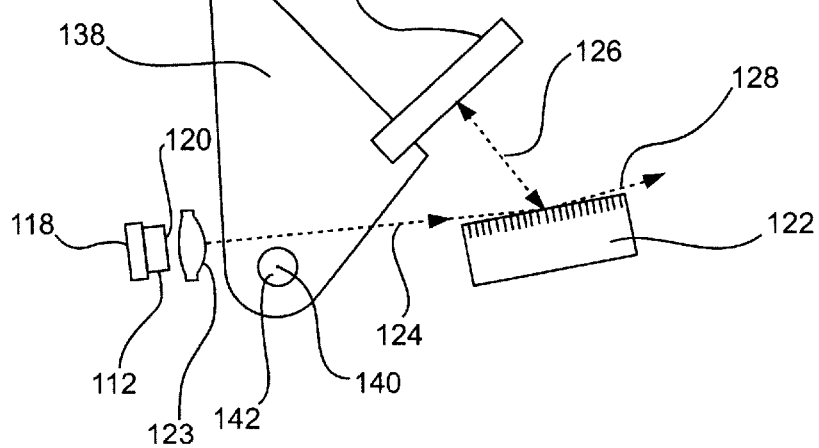
FIG. 16 is a schematic top plan view of a fifth embodiment of a tunable laser apparatus in accordance with the present invention.

Referring to FIG. 16, there is shown a fifth embodiment external cavity laser apparatus 190 in accordance with the invention, wherein like reference numbers are used to denote like parts, which also may be utilized as tunable laser 12 in system 10 or system 34 above. The apparatus 190 utilizes a drive assembly comprising a first magnet 192 coupled to actuator arm 138, and a second, non-contacting magnet 194 coupled to a drive arm 196. Drive arm 196 is coupled to a drive source (not shown) which moves drive arm 196 and magnet 194. Magnets 192, 194 exert mutually opposing forces against each other such that motion of magnet 194 via drive arm 196 will result in motion of magnet 192, which in turn pivots actuator arm 138 to move mirror 114 with respect to grating 22 and effect tuning of output 128. Magnets 192, 194 are non-contacting during drive motion, so the tuning motion provided to mirror 114 is basically noise free. Various other arrangements of magnets 192, 194, as well as additional magnets (not shown) may be used such that mutually opposing magnetic forces can be used to move mirror 114 for tuning of apparatus 190.

In certain uses of the invention which require a somewhat lower tuning speed, the tunable laser 12 used with system 10 or 34 may comprise the Hewlett Packard® (HP) model 81680A, model 81640A, or model 81682A tunable lasers. These HP tunable laser devices offer tuning speeds of up to 40 nanometers per second with acceptable tuning linearity. Due to the relatively low tuning speed, as well as the relatively high cost of these tunable lasers, they are currently less preferred for use with the invention than the other tunable laser devices described above.

The tunable laser 12 may alternatively comprise a standard tunable laser together with a fiber interferometer and a fast data acquisition card or board. The fiber interferometer provides known, evenly spaced (in frequency) triggers to the data acquisition card, which can then plot the spectral responses. This arrangement involves additional expense and complexity associated with use of the fiber interferometer and fast data acquisition card, and thus is currently less preferred.

Accordingly, it will be seen that this invention provides a system and method for real time process control, using a linearly swept tunable laser, which allows high speed in-situ monitoring and control of wavelength-specific properties of optical components, quick and easy wavelength-specific characterization of optical components. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for characterizing an optical component, comprising:
   (a) scanning said optical component with a tunable laser providing a constant change in output wavelength with respect to time during tuning;
   (b) detecting optical output from said optical component during said scanning; and
   (c) adjusting a wavelength specific property of said component in real time, according to said detecting of said optical output.

2. The method of claim 1, wherein said constant change in output wavelength is a linear change in output wavelength.

3. The method of claim 1, wherein said scanning is carried out at a laser tuning speed of at least one hundred nanometers per second.

4. The method of claim 1, further comprising adjusting said scanning according to said detecting of said optical output.

5. The method of claim 1, further comprising re-scanning said optical component, after said adjusting.

6. A method for characterization of a wavelength-specific property of an optical component, comprising:
(a) scanning said optical component over a selected wavelength range with a tunable laser having fast tuning and high tuning linearity;
(b) detecting optical output from said optical component during said scanning; and
(c) adjusting said wavelength-specific property of said component in real time, according to said detecting of said optical output.

7. The method of claim 6, wherein said scanning is carried out over said selected wavelength range at a tuning speed of at least one hundred nanometers per second.

8. The method of claim 6, wherein said scanning is carried out with a tuning linearity such that a wavelength error of no greater than 0.01 nanometer from best linear fit is provided.

9. The method of claim 6, further comprising adjusting said scanning according to said detecting of said optical output.

10. The method of claim 6, further comprising:
(a) monitoring detected output from said optical component, during said detecting, by a system controller; and
(b) controlling said wavelength specific property of said optical component, by said system controller, according to said monitoring of said detected output.

11. A method for real-time process control of an optical component having a wavelength specific property, comprising:
(a) scanning said optical component with a linearly swept tunable laser at a tuning speed of at least one hundred nanometers per second;
(b) detecting optical output from said optical component during said scanning; and
(c) controlling said wavelength specific property of said optical component in real time, in response to said detecting of said optical output.

12. The method of claim 11, wherein said scanning is carried out with a tuning linearity such that a wavelength error of no greater than 0.01 nanometer from best linear fit is provided.

13. The method of claim 11, further comprising adjusting said scanning in response to said detecting of said optical output.

14. A method for characterizing an optical component, comprising:
(a) scanning said optical component with a fast, linearly swept tunable laser, said fast linearly swept tunable laser providing a constant change in output frequency with respect to time during tuning;
(b) detecting optical output from said optical component during said scanning; and
(c) adjusting a wavelength-specific property of said component in real time, according to said detecting of said optical output.

15. The method of claim 14, wherein said constant change in output frequency is a linear change in output frequency.

16. The method of claim 14, further comprising re-scanning said optical component, after said adjusting.

17. A system for characterizing an optical component, comprising:
(a) a constant sweeping tunable laser;
(b) said optical component optically coupled to said constant sweeping tunable laser;
(c) an optical detector optically coupled to said optical component and configured to detect optical output from said optical component;
(d) a system controller operatively coupled to said optical detector and configured to monitor output from said detector; and
(e) a process control unit associated with said optical component and operatively coupled to said system controller, said process control unit configured to adjust a wavelength specific property of said optical component during sweeping of said constant sweeping tunable laser, according to instruction from said system controller.

18. The system of claim 17, wherein said constant sweeping tunable laser is a linearly sweeping tunable laser having a tuning rate of at least one hundred nanometers per second.

19. The system of claim 17, wherein said linear sweeping tunable laser is optically coupled to said system controller, said linear sweeping tunable laser configured to scan said optical component according to instruction from said system controller.

20. A system for real-time process control of a wavelength specific property of an optical component, comprising:
(a) tunable laser means for providing an output which varies linearly with respect to time, at a tuning speed of at least one hundred nanometers per second, said optical component optically coupled to said tunable laser means;
(b) means for detecting optical output from said optical component, said detecting means optically coupled to said optical component;
(c) means for adjusting said wavelength specific property of said optical component, said adjusting means operatively coupled to said optical component; and
(d) means for controlling said adjusting means in real time, according to output from said detecting means, said controlling means operatively coupled to said adjusting means and said detecting means.

* * * * *